(12) United States Patent
Kanamaru

(10) Patent No.: US 6,687,415 B1
(45) Date of Patent: Feb. 3, 2004

(54) INFORMATION PROCESSING METHOD, INFORMATION PROCESSING APPARATUS, AND RECORDING MEDIUM

(75) Inventor: Shoji Kanamaru, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/503,246

(22) Filed: Feb. 14, 2000

(30) Foreign Application Priority Data

Feb. 17, 1999 (JP) .......................................... 11-038410

(51) Int. Cl.[7] ................................................ G06K 9/36
(52) U.S. Cl. ...................................... 382/276; 382/302
(58) Field of Search ............................... 382/305, 100, 382/325, 307, 276, 302

(56) References Cited

U.S. PATENT DOCUMENTS 5,155,622 A * 10/1992 Kawatsuki et al. ......... 359/485
6,353,689 B1 * 3/2002 Kanamaru et al. ......... 382/280
6,392,914 B1 * 5/2002 Kuroki et al. .............. 365/118
6,416,714 B1 * 7/2002 Nova et al. ................ 422/68.1

* cited by examiner

Primary Examiner—Yon J. Couso
(74) Attorney, Agent, or Firm—Jay H. Maioli

(57) ABSTRACT

A method and apparatus, which can transform one multidimensional information pattern into another multidimensional information pattern and inversely transform the multidimensional information pattern having been transformed. Forward transform and inverse transform of a multidimensional information pattern are made by inputting information carriers expressed by n-dimensional vectors (n is a natural number) to a number n of information carrier storing elements which are distributed over an m-dimensional space (m is a natural number) and have the function of holding information carriers in a real number value; repeating processing to apply a predetermined amount of information carriers to the information carrier storing elements and outputting information carriers expressed by n-dimensional vectors from the number n of information carrier storing means.

106 Claims, 17 Drawing Sheets

INFORMATION PROCESSING METHOD, INFORMATION PROCESSING APPARATUS, AND RECORDING MEDIUM

BACKGROUND OF THE INVENTION

1. Field of the Invention

The present invention relates to an information processing method, an information processing apparatus, and a computer-readable recording medium recording an information processing program. More particularly, the present invention is suitably used for transforming one multidimensional information pattern into another multidimensional information pattern and for inversely transforming the multidimensional information pattern having been transformed.

2. Description of the Related Art

Heretofore, Fourier transform, Laplace transform, etc. have been known as information transforming methods for transforming one multidimensional information pattern into another multidimensional information pattern and for inversely transforming the multidimensional information pattern having been transformed.

On the other hand, a model utilizing a multidimensional discrete information pattern (M. Creutz, Computer in Physics 5, 198(1991)) has been proposed as a model capable of being inversely transformed.

Furthermore, a diffusion process described by a diffusion equation or the like is known as a method for transforming one multidimensional information pattern into another multidimensional information pattern.

However, the above conventional methods and model have problems as follows. Fourier transform, Laplace transform, etc. can be used with relatively easy analysis because of using numerical formula expressed in the simple form, but they are restricted in applications because of linear transform.

The model utilizing a multidimensional discrete information pattern cannot handle a continuous value, and therefore input information must be processed into the discrete form before starting transform of the information. Some of information is lost upon the processing into the discrete form.

The diffusion process described by a diffusion equation or the like is applicable only to forward transform, but not to inverse transform. Accordingly, the diffusion process has a difficulty in maintaining the amount of input information as it is.

SUMMARY OF THE INVENTION

It is therefore an object of the present invention is to provide an information processing method, an information processing apparatus, and a computer-readable recording medium recording an information processing program to implement the method and apparatus, which can transform one multidimensional information pattern into another multidimensional information pattern, is applicable to a wide range of applications, can handle a continuous value, and can prevent a loss of information.

Another object of the present invention is to provide an information processing method, an information processing apparatus, and a computer-readable recording medium recording an information processing program to implement the method and apparatus, which can transform one multidimensional information pattern into another multidimensional information pattern and inversely transform the multidimensional information pattern having been transformed, is applicable to a wide range of applications, can handle a continuous value, and can prevent a loss of information.

To achieve the above objects, a first aspect of the present invention provides an information processing method comprising an inputting step of inputting information carriers expressed by n-dimensional vectors (n is a natural number) to a number n of information carrier storing means which are distributed over an m-dimensional space (m is a natural number) and have the function of holding information carriers in a real number value; a processing step of repeating processing to apply a predetermined amount of information carriers to the information carrier storing means, to move a predetermined amount of information carriers among a predetermined set of the information carrier storing means, and to dissipate a predetermined amount of information carriers from the information carrier storing means; and an outputting step of outputting information carriers expressed by n-dimensional vectors from the number n of information carrier storing means.

A second aspect of the present invention provides an information processing method comprising an inputting step of inputting information carriers expressed by n-dimensional vectors (n is a natural number) to a number n of information carrier storing means which are distributed over an m-dimensional space (m is a natural number) and have the function of holding information carriers in a real number value; a processing step of repeating processing to apply a predetermined amount of information carriers to those of the information carrier storing means which are positioned in the vicinity of a geometrical surface, to move a predetermined amount of information carriers among a predetermined set of the information carrier storing means, and to dissipate a predetermined amount of information carriers from the information carrier storing means; and an outputting step of outputting information carriers expressed by n-dimensional vectors from the number n of information carrier storing means.

A third aspect of the present invention provides an information processing method comprising a first inputting step of inputting information carriers expressed by n-dimensional vectors (n is a natural number) to a number n of information carrier storing means which are distributed over an m-dimensional space (m is a natural number) and have the function of holding information carriers in a real number value; a first processing step of repeating processing to apply a predetermined amount of information carriers to the information carrier storing means, to move a predetermined amount of information carriers among a predetermined set of the information carrier storing means, and to dissipate a predetermined amount of information carriers from the information carrier storing means; a first outputting step of outputting information carriers expressed by n-dimensional vectors from the number n of information carrier storing means; a second inputting step of inputting the information carriers expressed by n-dimensional vectors and output in the first outputting step to the number n of information carrier storing means; a second processing step of repeating processing to apply a predetermined amount of information carriers to those of the information carrier storing means which are positioned in the vicinity of a geometrical surface, to move a predetermined amount of information carriers among a predetermined set of the information carrier storing means, and to dissipate a predetermined amount of information carriers from the information carrier storing means; and a second outputting step of outputting information carriers expressed by n-dimensional vectors from the number n of information carrier storing means.

A fourth aspect of the present invention provides an information processing apparatus employing a number n (n is a natural number) of information carrier storing means which are distributed over an m-dimensional space (m is a natural number) and have the function of holding information carriers in a real number value, the apparatus comprising an inputting function of inputting information carriers expressed by n-dimensional vectors to the information carrier storing means; a processing function of repeating processing to apply a predetermined amount of information carriers to the information carrier storing means, to move a predetermined amount of information carriers among a predetermined set of the information carrier storing means, and to dissipate a predetermined amount of information carriers from the information carrier storing means; and an outputting function of outputting information carriers expressed by n-dimensional vectors from the number n of information carrier storing means.

A fifth aspect of the present invention provides an information processing apparatus employing a number n (n is a natural number) of information carrier storing means which are distributed over an m-dimensional space (m is a natural number) and have the function of holding information carriers in a real number value, the apparatus comprising an inputting function of inputting information carriers expressed by n-dimensional vectors (n is a natural number) to the information carrier storing means; a processing function of repeating processing to apply a predetermined amount of information carriers to those of the information carrier storing means which are positioned in the vicinity of a geometrical surface, to move a predetermined amount of information carriers among a predetermined set of the information carrier storing means, and to dissipate a predetermined amount of information carriers from the information carrier storing means; and an outputting function of outputting information carriers expressed by n-dimensional vectors from the number n of information carrier storing means.

A sixth aspect of the present invention provides an information processing apparatus employing a number n (n is a natural number) of information carrier storing means which are distributed over an m-dimensional space (m is a natural number) and have the function of holding information carriers in a real number value, the apparatus comprising a first inputting function of inputting information carriers expressed by n-dimensional vectors (n is a natural number) to the information carrier storing means; a first processing function of repeating processing to apply a predetermined amount of information carriers to the information carrier storing means, to move a predetermined amount of information carriers among a predetermined set of the information carrier storing means, and to dissipate a predetermined amount of information carriers from the information carrier storing means; a first outputting function of outputting information carriers expressed by n-dimensional vectors from the number n of information carrier storing means; a second inputting function of inputting the information carriers expressed by n-dimensional vectors and output by the first outputting function to the information carrier storing means; a second processing function of repeating processing to apply a predetermined amount of information carriers to those of the information carrier storing means which are positioned in the vicinity of a geometrical surface, to move a predetermined amount of information carriers among a predetermined set of the information carrier storing means, and to dissipate a predetermined amount of information carriers from the information carrier storing means; and a second outputting function of outputting information carriers expressed by n-dimensional vectors from the number n of information carrier storing means.

A seventh aspect of the present invention provides an information processing apparatus comprising an input unit to which data expressed by n-dimensional vectors (n is a natural number) is input; a storage unit made up of a number n of information carrier storing means and storing the data input to the input unit; a control unit for repeatedly executing processing to apply a predetermined amount of information carriers to the data stored in the storage unit, to move a predetermined amount of information carriers, and to dissipate a predetermined amount of information carriers; a random number generating unit for generating a random number and sending the generated random number to the control unit; a determining unit for determining whether a change in amount of the information carriers in each of the information carrier storing means has become equal to or less than a predetermined value; and an output unit for outputting a processing result from the control unit.

An eighth aspect of the present invention provides a recording medium recording an information processing program and being readable by a computer, the program comprising an inputting step of inputting information carriers expressed by n-dimensional vectors (n is a natural number) to a number n of information carrier storing means which are distributed over an m-dimensional space (m is a natural number) and have the function of holding information carriers in a real number value; a processing step of repeating processing to apply a predetermined amount of information carriers to the information carrier storing means, to move a predetermined amount of information carriers among a predetermined set of the information carrier storing means, and to dissipate a predetermined amount of information carriers from the information carrier storing means; and an outputting step of outputting information carriers expressed by n-dimensional vectors from the number n of information carrier storing means.

A ninth aspect of the present invention provides a recording medium recording an information processing program and being readable by a computer, the program comprising an inputting step of inputting information carriers expressed by n-dimensional vectors (n is a natural number) to a number n of information carrier storing means which are distributed over an m-dimensional space (m is a natural number) and have the function of holding information carriers in a real number value; a processing step of repeating processing to apply a predetermined amount of information carriers to those of the information carrier storing means which are positioned in the vicinity of a geometrical surface, to move a predetermined amount of information carriers among a predetermined set of the information carrier storing means, and to dissipate a predetermined amount of information carriers from the information carrier storing means; and an outputting step of outputting information carriers expressed by n-dimensional vectors from the number n of information carrier storing means.

A tenth aspect of the present invention provides a recording medium recording an information processing program and being readable by a computer, the program comprising a first inputting step of inputting information carriers expressed by n-dimensional vectors (n is a natural number) to a number n of information carrier storing means which are distributed over an m-dimensional space (m is a natural number) and have the function of holding information carriers in a real number value; a first processing step of repeating processing to apply a predetermined amount of information carriers to the information carrier storing means, to move a predetermined amount of information carriers among a predetermined set of the information carrier storing means, and to dissipate a predetermined amount of information carriers from the information carrier storing means; a first outputting step of outputting information carriers expressed by n-dimensional vectors from the number n of information carrier storing means; a second inputting step of inputting the information carriers expressed by n-dimensional vectors and output in the first outputting step to the number n of information carrier storing means; a second processing step of repeating processing to apply a predetermined amount of information carriers to those of the information carrier storing means which are positioned in the vicinity of a geometrical surface, to move a predetermined amount of information carriers among a predetermined set of the information carrier storing means, and to dissipate a predetermined amount of information carriers from the information carrier storing means; and a second outputting step of outputting information carriers expressed by n-dimensional vectors from the number n of information carrier storing means.

In the present invention, information carriers may be in any of the discrete and continuous form. Also, there are basically no restrictions on geometrical distribution of the number n of information carrier storing means over the m-dimensional space. For example, the information carrier storing means may be distributed in either regular or irregular array. Further, m and n may be each basically any natural number, but m is typically equal to or less than 3.

The processing step or function in the first, fourth and eighth aspect of the present invention, and the first processing step or function in the third, sixth and tenth aspect of the present invention each typically include a step or function of applying a predetermined amount of information carriers to the number n of information carrier storing means at random.

The processing step or function in the first, second, fourth, fifth, eighth and ninth aspect of the present invention, and the first processing step or function and the second processing step or function in the third, sixth and tenth aspect of the present invention each typically includes a diffusing step or function of moving the information carriers in each of the information carrier storing means to the information carrier storing means which are positioned in the vicinity of each information carrier storing means. The diffusing step is typically a step of diffusing the information carriers in the number n of information carrier storing means through nonlinear diffusion to the information carrier storing means which are positioned in the vicinity of each of the information carrier storing means.

The nonlinear diffusion is expressed, for example, by the following formula (1);

$$z(r,t+h)=z(r,t)+h \cdot (R(r,t)+D \cdot \nabla^2 f(z(r,t))-d(r,t)) \quad (1)$$

where r is spacial coordinate of each of the information carrier storing means, t is time, z(r,t) is an amount of information carriers stored in the information carrier storing means corresponding to the spacial coordinate r and the time t, h is a differential parameter, R(r,t) is a function representing the amount of applied information carriers, D is a diffusion constant, f(z(r,t)) is a function defined by the following formula (2), and d(r,t) is a function representing the dissipation of information carriers, and the following formula (2);

$$f(z(r,t)) = \frac{1}{1+\exp[-\beta(z(r,t)-z_0)]} \quad (2)$$

where $\beta$ and $z_0$ are each a predetermined constant. In the above formulae, $\beta$ is usually set such that a maximum value of natural numbers resulting from the n-dimensional vectors output in the outputting step or function, or the first outputting step or function, or the second outputting step or function is equal to the value obtained by subtracting one from the number of the information carrier storing means which are positioned in the vicinity of each of the information carrier storing means.

The processing step or function in the first, second, fourth, fifth, eighth and ninth aspect of the present invention, and the first processing step or function and the second processing step or function in the third, sixth and tenth aspect of the present invention each typically includes a step of dissipating the information carriers from the information carrier storing means which are positioned in the vicinity of a surface defined by a distributed group of the number n of information carrier storing means.

The processing step or function in the first, second, fourth, fifth, eighth and ninth aspect of the present invention, and the first processing step or function and the second processing step or function in the third, sixth and tenth aspect of the present invention each typically further includes a step of dissipating the information carriers from the number n of information carrier storing means.

The processing step or function in the second, fifth and ninth aspect of the present invention, and the second processing step or function in the third, sixth and tenth aspect of the present invention each typically includes The processing step or function in the first, second, fourth, fifth, eighth and ninth aspect of the present invention, and the first processing step or function and the second processing step or function in the third, sixth and tenth aspect of the present invention each typically includes a step of applying a predetermined amount of information carriers to the information carrier storing means which are positioned in the vicinity of a surface defined by a distributed group of the number n of information carrier storing means.

The processing step or function in the first, fourth and eighth aspect of the present invention, and the first processing step or function in the third, sixth and tenth aspect of the present invention each typically applies information carriers in such an amount that an integral value becomes equal to the product of the number of the information carrier storing means, which are positioned in the vicinity of each of the information carrier storing means, and n.

The processing step or function in the first, fourth and eighth aspect of the present invention, and the first processing step or function in the third, sixth and tenth aspect of the present invention each typically includes a step of binary-coding each element of the information carriers expressed by n-dimensional vectors.

With the present invention thus constructed, one multidimensional information pattern can be transformed into another multidimensional information pattern by inputting information carriers expressed by n-dimensional vectors, i.e., a multidimensional information pattern in general, to a number n of information carrier storing means which are distributed over an m-dimensional space; repeating processing to apply information carriers to the information carrier storing means, to move information carriers among a predetermined set of the information carrier storing means, and to dissipate information carriers from the information carrier storing means; and outputting a processing result in the form of information carriers expressed by n-dimensional vectors. Then, the multidimensional information pattern having been transformed can be inversely transformed by inputting the multidimensional information pattern having been transformed, i.e., the information carriers expressed by n-dimensional vectors, to the number n of information carrier storing means; repeating processing to apply information carriers to those of the information carrier storing means which are positioned in the vicinity of a geometrical surface, to move information carriers among a predetermined set of the information carrier storing means, and to dissipate information carriers from the information carrier storing means; and outputting a processing result in the form of information carriers expressed by n-dimensional vectors. Since both the forward transform and the inverse transform can be performed, novel information processing between an input space and another space can be achieved in a similar way to Fourier transform, Laplace transform, etc. which have been often employed so far. In particular, since the information carriers are moved through nonlinear diffusion expressed by the formulae (1) and (2), it becomes possible to achieve engineering applications to processing that has been difficult to achieve with the conventional linear transform. Further, since both the types of transform according to the present invention can deal with continuous values, there is no need of processing input information into the discrete form before starting transform of the information, and therefore a loss of information can be prevented.

DESCRIPTION OF THE PREFERRED EMBODIMENT

One embodiment of the present invention will be described below with reference to the drawings.

Figure 1:
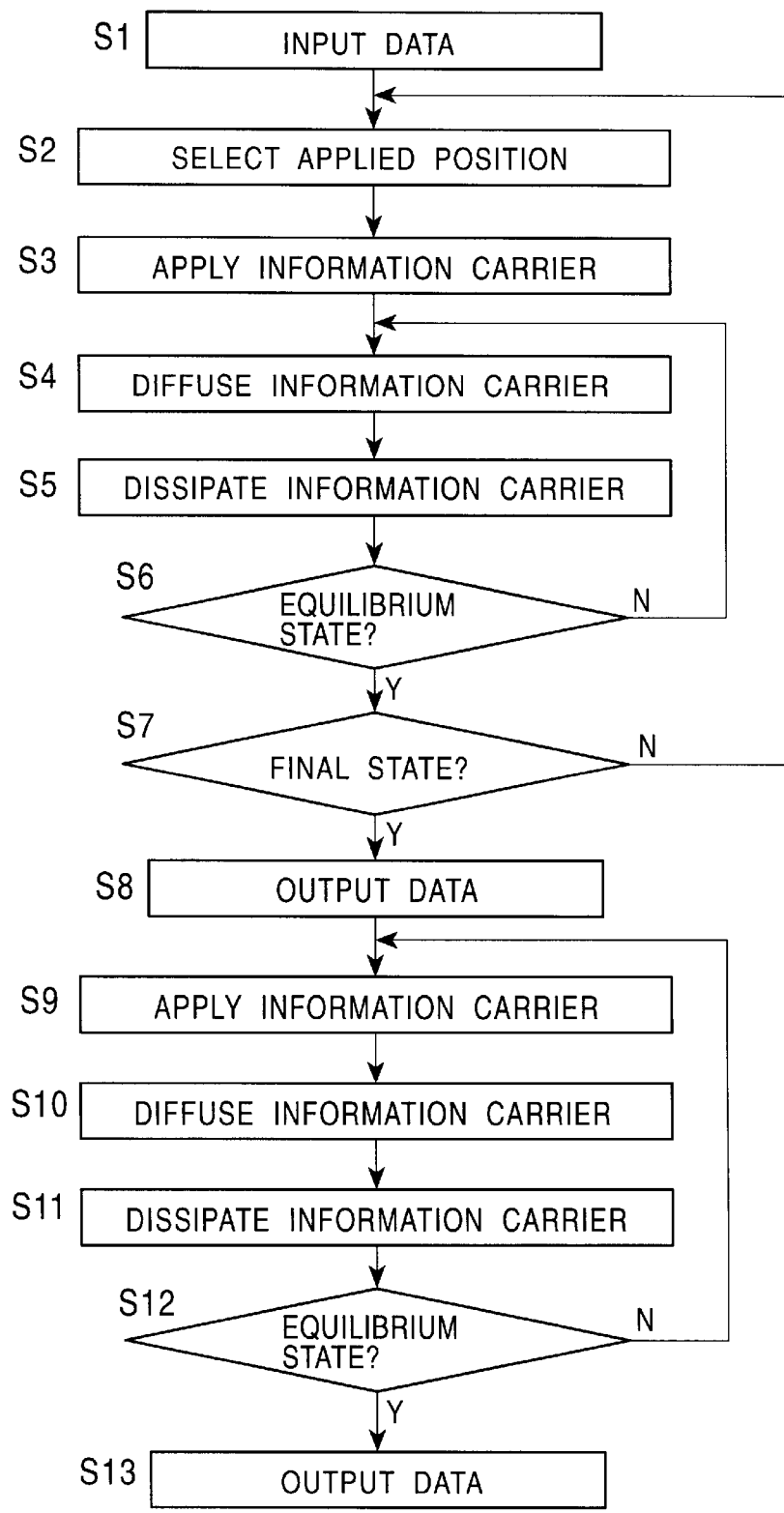
FIG. 1 is a flowchart showing an information transforming method according to one embodiment of the present invention.
Figure 2:
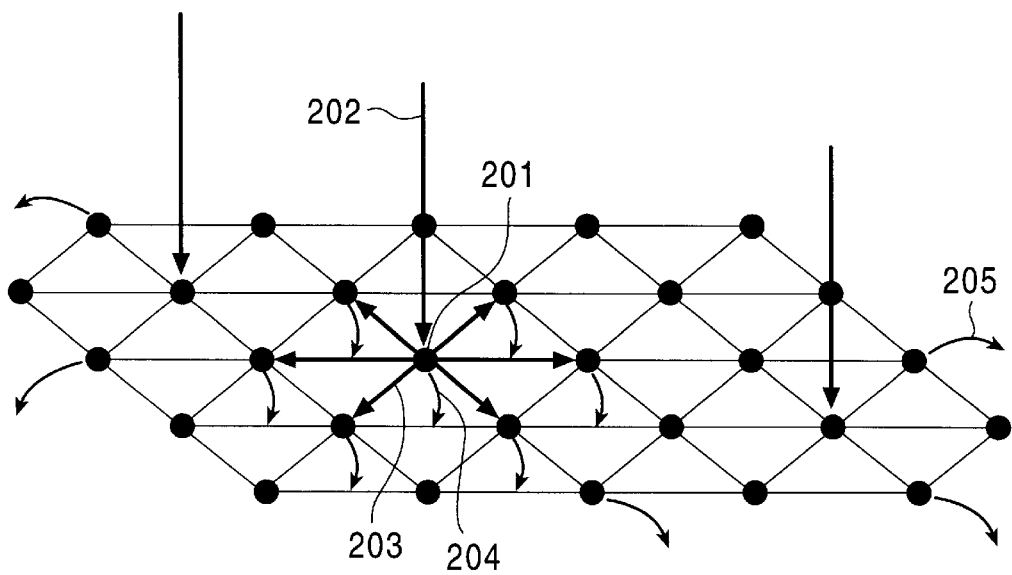
FIG. 2 is a diagram showing the construction of a storage unit of an information transforming apparatus according to the one embodiment of the present invention.

FIG. 1 is a flowchart showing an information transforming method according to one embodiment of the present invention. FIG. 2 shows the construction of an information transforming apparatus, in particular, a storage unit thereof, according to the one embodiment of the present invention. In FIG. 2, though described in detail later, numeral 201 denotes an information carrier storing means, 202 denotes application of information carriers, 203 denotes diffusion, and 204 denotes dissipation.

Figure 3:
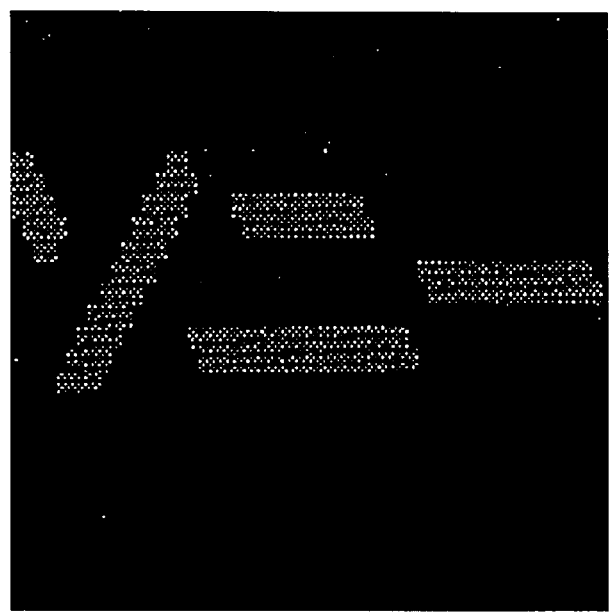
FIG. 3 is a photographic representation showing, in gray scale, the amounts of information carriers stored in information carrier storing means resulting from the flow of a series of steps of the information transforming method according to the one embodiment of the present invention.
Figure 4:
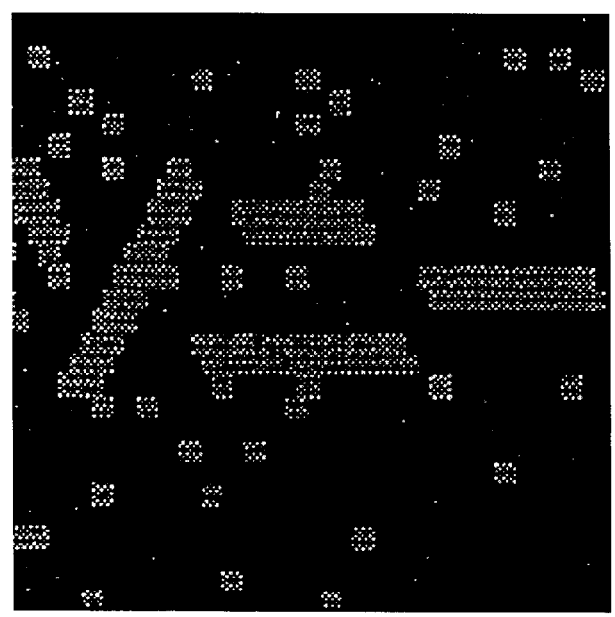
FIG. 4 is a photographic representation showing, in gray scale, the amounts of information carriers stored in the information carrier storing means resulting from the flow of a series of steps of the information transforming method according to the one embodiment of the present invention.
Figure 5:
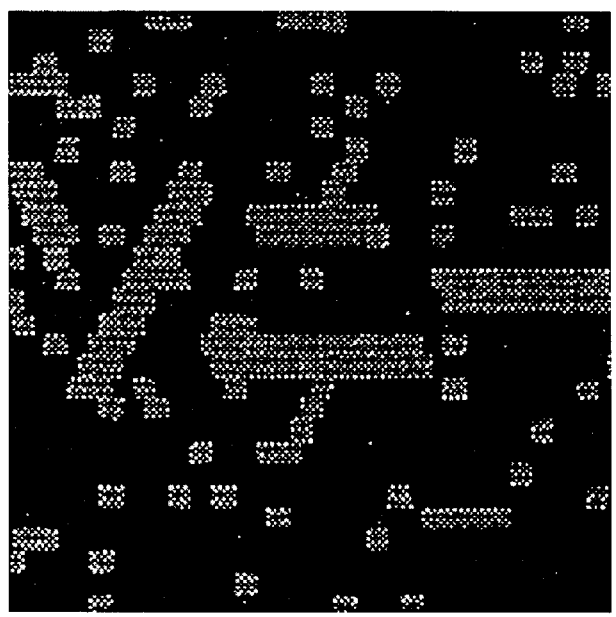
FIG. 5 is a photographic representation showing, in gray scale, the amounts of information carriers stored in the information carrier storing means resulting from the flow of a series of steps of the information transforming method according to the one embodiment of the present invention.
Figure 6:
FIG. 6 is a photographic representation showing, in gray scale, the amounts of information carriers stored in the information carrier storing means resulting from the flow of a series of steps of the information transforming method according to the one embodiment of the present invention.
Figure 7:
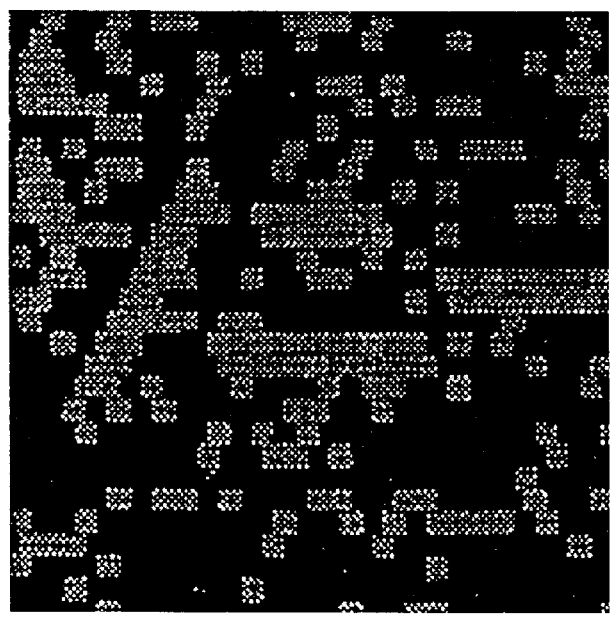
FIG. 7 is a photographic representation showing, in gray scale, the amounts of information carriers stored in the information carrier storing means resulting from the flow of a series of steps of the information transforming method according to the one embodiment of the present invention.
Figure 8:
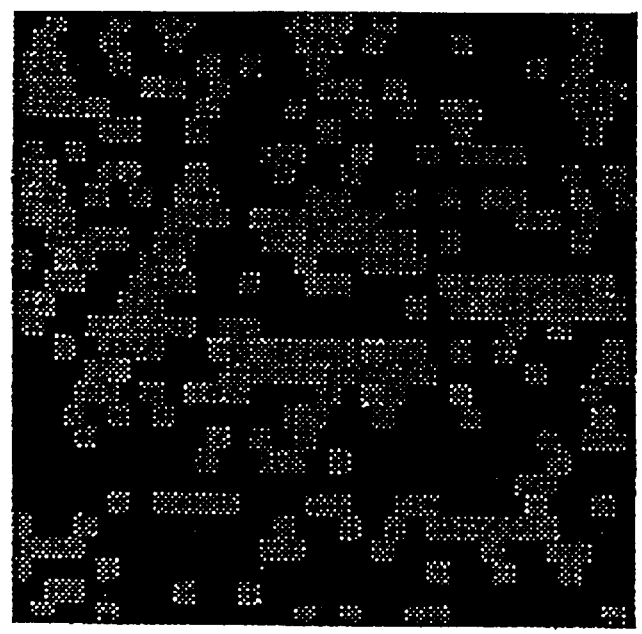
FIG. 8 is a photographic representation showing, in gray scale, the amounts of information carriers stored in the information carrier storing means resulting from the flow of a series of steps of the information transforming method according to the one embodiment of the present invention.
Figure 9:
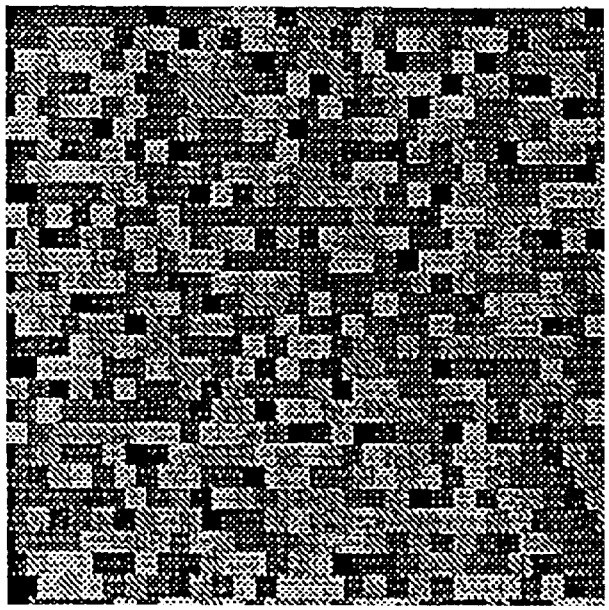
FIG. 9 is a photographic representation showing, in gray scale, the amounts of information carriers stored in the information carrier storing means resulting from the flow of a series of steps of the information transforming method according to the one embodiment of the present invention.
Figure 10:
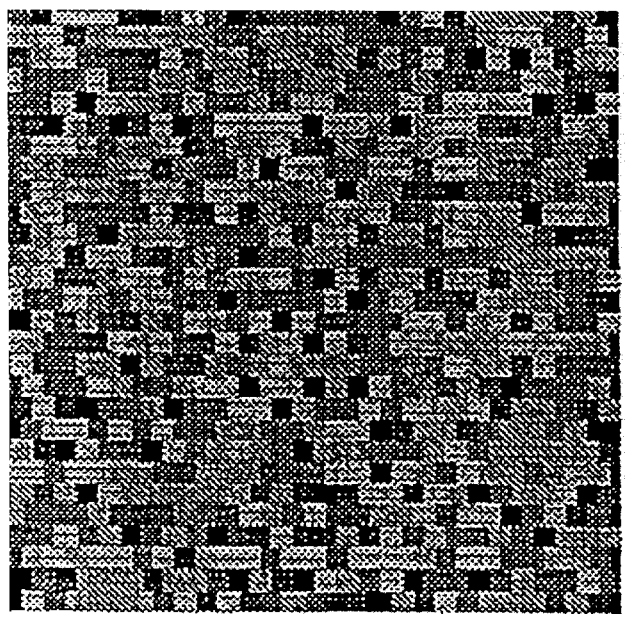
FIG. 10 is a photographic representation showing, in gray scale, the amounts of information carriers stored in the information carrier storing means resulting from the flow of a series of steps of the information transforming method according to the one embodiment of the present invention.
Figure 11:
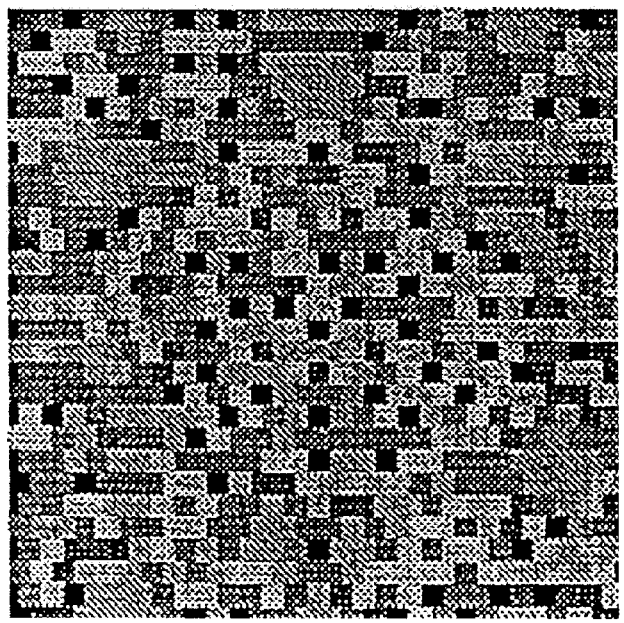
FIG. 11 is a photographic representation showing, in gray scale, the amounts of information carriers stored in the information carrier storing means resulting from the flow of a series of steps of the information transforming method according to the one embodiment of the present invention.
Figure 12:
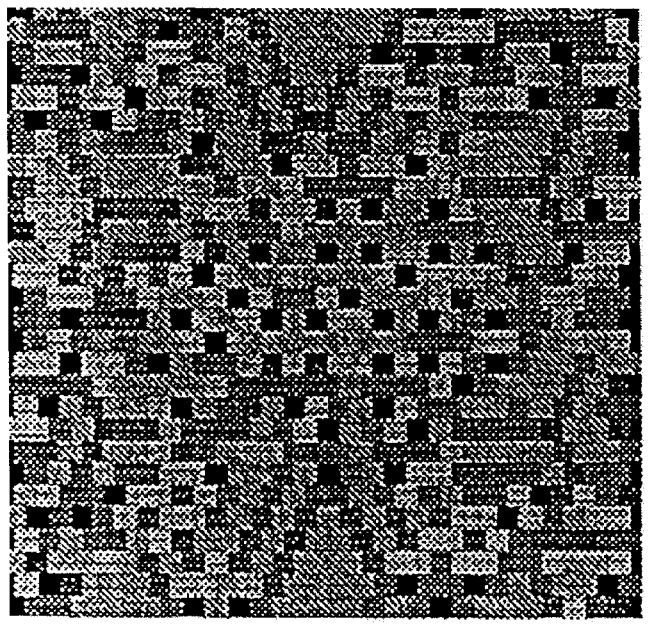
FIG. 12 is a photographic representation showing, in gray scale, the amounts of information carriers stored in the information carrier storing means resulting from the flow of a series of steps of the information transforming method according to the one embodiment of the present invention.
Figure 13:
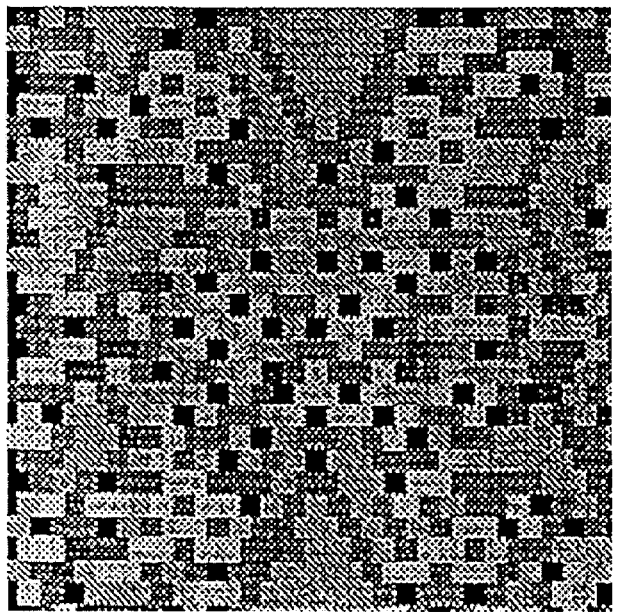
FIG. 13 is a photographic representation showing, in gray scale, the amounts of information carriers stored in the information carrier storing means resulting from the flow of a series of steps of the information transforming method according to the one embodiment of the present invention.

Referring to the flowchart of FIG. 1, first in step S1, information carriers expressed by 784-dimensional vectors are input to 784 units of information carrier storing means distributed over a two-dimensional space. A black circle denoted by 201 in FIG. 2 represents each of the information carrier storing means. As shown in FIG. 2, the information carrier storing means 201 are distributed over a two-dimensional space in such a triangular lattice structure that six information carrier storing means are hexagonally positioned in the vicinity of each information carrier storing means 201. In the illustrated structure, the total 784 units of information carrier storing means 201 make up a matrix comprising 28 units in the horizontal direction and 28 units in the vertical direction. FIG. 3 shows a condition of the information carrier storing means 201 to which the information carriers are input. In FIG. 3, the amount of information carriers stored in each information carrier storing means 201 is represented in gray scale. More specifically, a white color indicates a large value, a black color indicates a small value, and a gray color indicates an intermediate value, Then, in step S2, one of the 784 information carrier storing means 201 is selected. The position of the selected one is decided at random. Assume here that the information carrier storing means denoted by 201 in FIG. 2 is selected.

In step S3, a unit amount of information carriers are applied to the selected information carrier storing means 201. Numeral 202 in FIG. 2 denotes the application of information carriers in unit amount.

In step S4, the information carriers are diffused from the selected information carrier storing means 201 to six information carrier storing means hexagonally positioned in the vicinity of the selected one. Numeral 203 in FIG. 2 denotes the diffusion of information carriers. The amount of diffused information carriers is determined by the second term in parenthesis of the second term on the right side of the following formula (1):

$$z(r,t+h)=z(r,t)+h\cdot(R(r,t)+D\cdot\nabla^2 f(z(r,t))-d(r,t)) \quad (1)$$

where $$f(z(r, t)) = \frac{1}{1 + \exp[-\beta(z(r, t) - z_0)]} \quad (2)$$

In the above formulae, r is spacial coordinate of the information carrier storing means 201, t is time, z(r,t) is an amount of information carriers stored in the information carrier storing means 201 corresponding to the spacial coordinate r and the time t, h is a differential parameter, R(r,t) is a function representing the amount of applied information carriers, D is a diffusion constant, f(z(r,t)) is a function defined by the formula (2), and d(r,t) is a function representing the dissipation of information carriers. Also, β, $z_0$ and D are each a predetermined constant. In this embodiment, β=100, $z_0$=5.5, and D=1 are assumed. Further, h=1 is assumed. A diffusion equation usually expresses linear diffusion in which the function f(z) expressed by the second term in parenthesis of the second term on the right side of the formula (1) is linear with respect to the variable z. By contrast, the function f(z) used in this embodiment is nonlinear with respect to the variable z as expressed by the formula (2). Accordingly, the diffusion performed in step S4, i.e., the diffusion 203 in FIG. 2, represents a nonlinear diffusion process.

In step S5, the information carriers are dissipated from the information carrier storing means 201. The dissipation is expressed by the third term in parenthesis of the second term on the right side of the formula (1). There are two kinds of dissipation performed in step S5; dissipation from all of the information carrier storing means 201 and dissipation from the information carrier storing means 201 which are positioned at the boundary. In FIG. 2, numeral 204 denotes the former and 205 denotes the latter. The dissipation denoted by 204 in FIG. 2 is performed from all of the information carrier storing means 201 in amount much smaller than the amount of the diffusion performed in step S4. Concretely, the amount ratio of the diffusion to the dissipation is on the order of 100000:1 in this embodiment. On the other hand, the dissipation denoted by 205 in FIG. 2 is performed only from the information carrier storing means 201 which are positioned at the boundary. The amount of the dissipation denoted by 205 is assumed to be the same as the amount of the diffusion performed in step S4. Stated otherwise, the amount of the dissipation denoted by 205 is given by the total sum of the amounts of diffused information carriers which are resulted from imaginarily arranging, in addition to the information carrier storing means 201 which are positioned at the boundary, other information carrier storing means outside the boundary and allowing the information carriers to diffuse from those imaginarily-arranged information carrier storing means in accordance with the diffusion that is determined by the second term in parenthesis of the second term on the right side of the formula (1) and the formula (2).

After performing steps S4 and S5, it is determined in step S6 whether a change in amount of the information carriers in each information carrier storing means 201 has become small. In this embodiment, the determination is made by checking whether a maximum value of changes in amount of the information carriers in the information carrier storing means 201 has become smaller than 0.001. This value may be smaller than 0.001. If the maximum value of changes in amount of the information carriers is not smaller than 0.001, it is determined that the equilibrium state is not yet reached. The control flow then returns to step S4 to repeat the diffusion (step S4) and the dissipation (step S5). If the maximum value is smaller than 0.001, it is determined that the equilibrium state has been reached. The control flow then goes to next step S7.

In step S7, it is determined whether the group of information carrier storing means has reached the final state. In this embodiment, whether to have reached the final state is determined depending upon an integral value of the amount of information carriers applied in step S3. If the integral value is not smaller than 4704, it is determined that the final state has been reached. If it is determined that the final state has been reached, the control flow goes to step S8, and if it is determined that the final state has not been reached, the control flow returns to step S2. In the latter case, another position to which the unit amount of information carriers is to be applied is determined, and the information carriers are applied in step S3.

In step S8, the amount of information carriers stored in each of the information carrier storing means 201, for which it was determined in step S7 that the final state had been reached, is output as a numerical value. At this time, threshold processing may be performed so that the amount of information carriers is output in the form of natural number.

Figure 14:
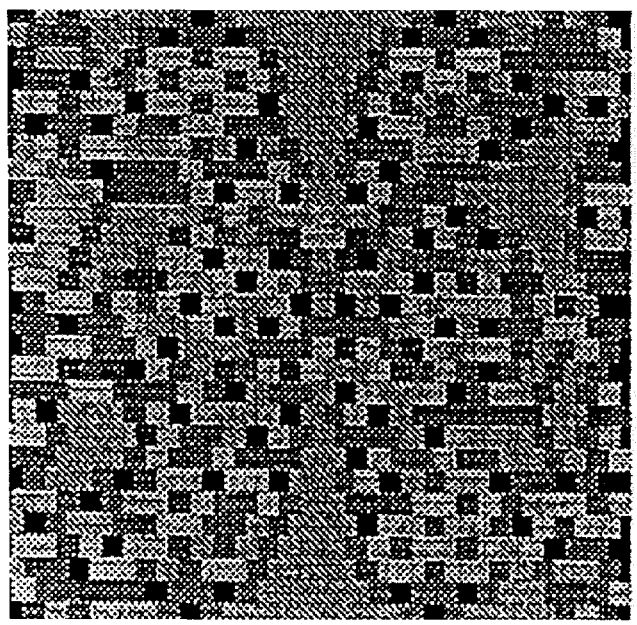
FIG. 14 is a photographic representation showing, in gray scale, the amounts of information carriers stored in the information carrier storing means resulting from the flow of a series of steps of the information transforming method according to the one embodiment of the present invention.

FIGS. 3 to 14 show the amounts of information carriers stored in the information carrier storing means 201 resulting from the flow of a series of steps S1 to S8. In FIG. 3, as mentioned above, the amount of information carriers stored in each information carrier storing means 201 is represented in gray scale. By repeating the process from step S2 to S6, the amounts of information carriers stored in the information carrier storing means 201 are changed successively as shown in FIGS. 4, 5, 6, 7 and 8. The reason why FIGS. 4 to 8 appear as if noises are added in an increasing manner, is that the position to which the information carriers are applied is selected at random in step S2. By further repeating the process from step S2 to S6, the amounts of information carriers stored in the information carrier storing means 201 are changed successively as shown in FIGS. 9, 10, 11, 12 and 13. Other intermediate states than shown are omitted. FIG. 14 shows the amounts of information carriers stored in the information carrier storing means 201 at the time of reaching the final state. When reaching the final state, as seen from FIG. 14, a pattern having a predetermined structure appears as a two-dimensional pattern which is formed by the amounts of information carriers stored in the information carrier storing means 201, although randomness of such a two-dimensional pattern has increased in the earlier steps. The resultant final pattern is output in step S8.

Next, in step S9, information carriers are applied to the information carrier storing means 201 which are positioned at the boundary, i.e., to the information carrier storing means from which the information carriers were dissipated in step S5 as indicated by 205 in FIG. 2.

In step S10, the information carriers are diffused from one information carrier storing means 201 to six information carrier storing means hexagonally positioned in the vicinity of the one. Numeral 203 in FIG. 2 denotes the diffusion of information carriers. The amount of diffused information carriers is determined by the second term in parenthesis of the second term on the right side of the formula (1) and the formula (2). In the formulae, $\beta$, $z_0$ and D are each a predetermined constant. As mentioned above, $\beta=100$, $z_0=5.5$, and D=1 are assumed in this embodiment. A diffusion equation usually expresses linear diffusion in which the function f(z) expressed by the second term in parenthesis of the second term on the right side of the formula (1) is linear with respect to the variable z. By contrast, the function f(z) used in this embodiment is nonlinear with respect to the variable z as expressed by the formula (2). Accordingly, the diffusion performed in step S10, i.e., the diffusion 203 in FIG. 2, represents a nonlinear diffusion process.

In step S11, the information carriers are dissipated from the information carrier storing means 201. The dissipation is expressed by the third term in parenthesis of the second term on the right side of the formula (1). There are two kinds of dissipation performed in step S11; dissipation from all of the information carrier storing means 201 and dissipation from the information carrier storing means 201 which are positioned at the boundary. In FIG. 2, numeral 204 denotes the former and 205 denotes the latter. The dissipation denoted by 204 in FIG. 2 is performed from all of the information carrier storing means 201 in amount much smaller than the amount of the diffusion performed in step S10. As mentioned above, the amount ratio of the diffusion to the dissipation is on the order of 100000:1 in this embodiment. On the other hand, the dissipation denoted by 205 in FIG. 2 is performed only from the information carrier storing means 201 which are positioned at the boundary. The amount of the dissipation denoted by 205 is assumed to be the same as the amount of the diffusion performed in step S10. Stated otherwise, the amount of the dissipation denoted by 205 is given by the total sum of the amounts of diffused information carriers which are resulted from imaginarily arranging, in addition to the information carrier storing means 201 which are positioned at the boundary, other information carrier storing means outside the boundary and allowing the information carriers to diffuse from those imaginarily-arranged information carrier storing means in accordance with the diffusion that is determined by the second term in parenthesis of the second term on the right side of the formula (1) and the formula (2).

After performing steps S10 and S11, it is determined in step S12 whether a change in amount of the information carriers in each information carrier storing means 201 has become small. In this embodiment, the determination is made by checking whether a maximum value of changes in amount of the information carriers in the information carrier storing means 201 has become smaller than 0.001. This value may be smaller than 0.001. If the maximum value of changes in amount of the information carriers is not smaller than 0.001, it is determined that the equilibrium state is not yet reached. The control flow then returns to step S9 to repeat the application (step S9), the diffusion (step S10) and the dissipation (step S1) of the information carriers. If the maximum value is smaller than 0.001, it is determined that the equilibrium state has been reached. The control flow then goes to next step S13. The equilibrium state reached at this time is not a static equilibrium state, but a dynamic equilibrium state where the dissipation of information carriers from the information carrier storing means 201, which are positioned at the boundary, is balanced by the addition of information carriers applied to the information carrier storing means 201 which are positioned at the boundary.

In step S13, the amount of information carriers stored in each of the information carrier storing means 201, for which it was determined in step S12 that the equilibrium state had been reached, is output as a numerical value. At this time, threshold processing may be performed so that the amount of information carriers is output in the form of natural number.

Figure 15:
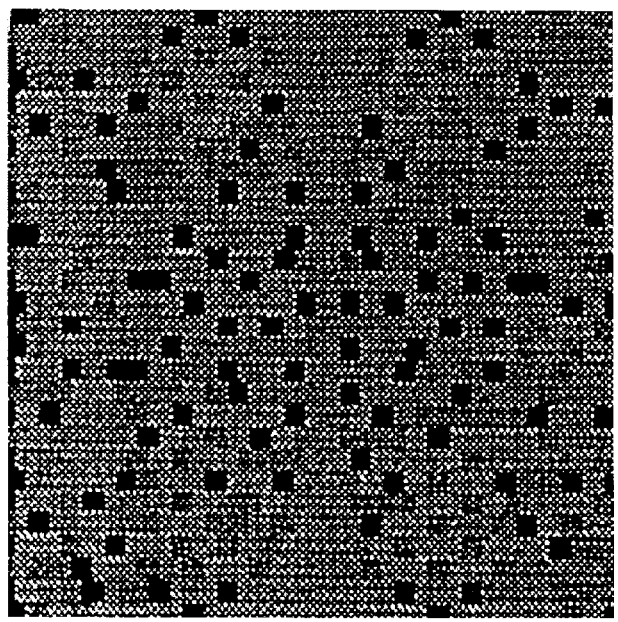
FIG. 15 is a photographic representation showing, in gray scale, the amounts of information carriers stored in the information carrier storing means resulting from the flow of a series of steps of the information transforming method according to the one embodiment of the present invention.
Figure 16:
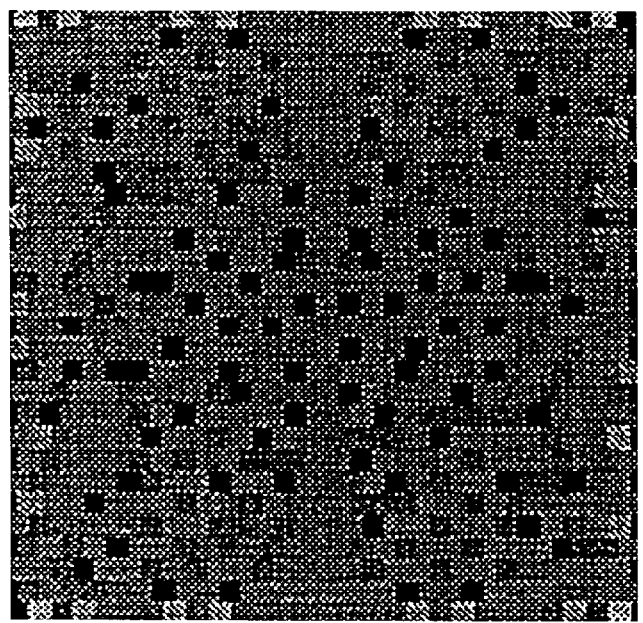
FIG. 16 is a photographic representation showing, in gray scale, the amounts of information carriers stored in the information carrier storing means resulting from the flow of a series of steps of the information transforming method according to the one embodiment of the present invention.
Figure 17:
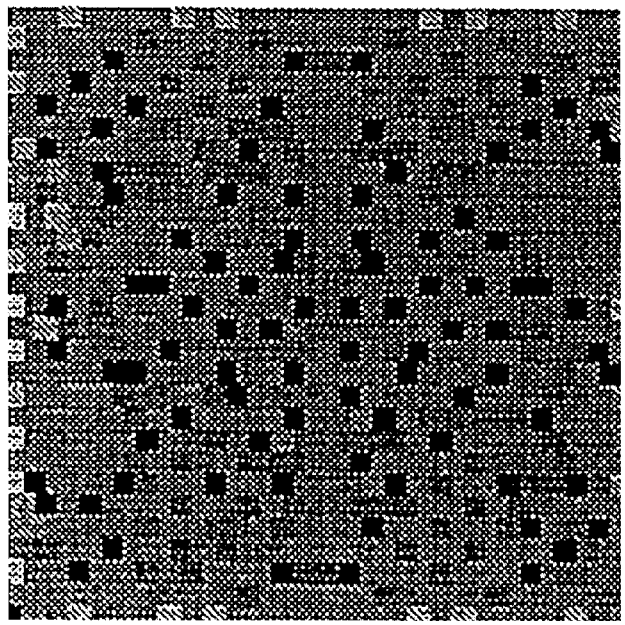
FIG. 17 is a photographic representation showing, in gray scale, the amounts of information carriers stored in the information carrier storing means resulting from the flow of a series of steps of the information transforming method according to the one embodiment of the present invention.
Figure 18:
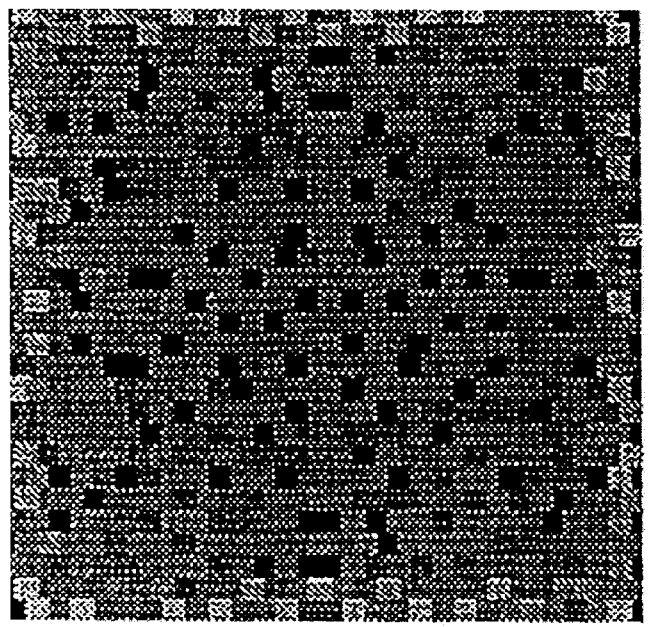
FIG. 18 is a photographic representation showing, in gray scale, the amounts of information carriers stored in the information carrier storing means resulting from the flow of a series of steps of the information transforming method according to the one embodiment of the present invention.
Figure 19:
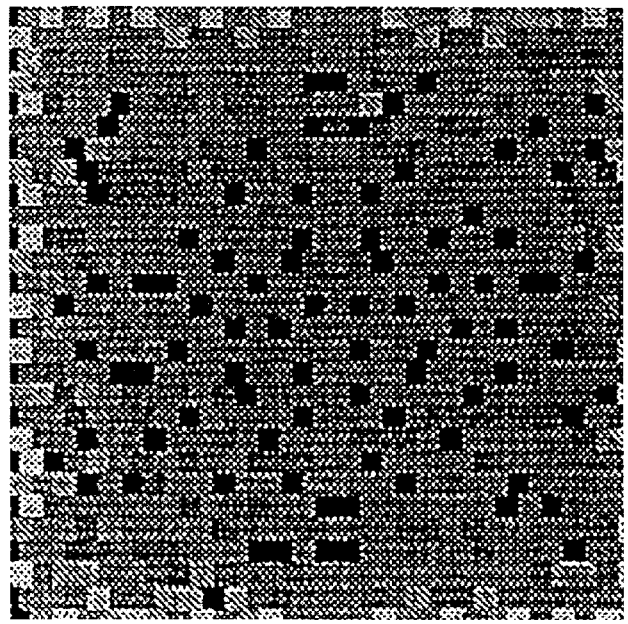
FIG. 19 is a photographic representation showing, in gray scale, the amounts of information carriers stored in the information carrier storing means resulting from the flow of a series of steps of the information transforming method according to the one embodiment of the present invention.
Figure 20:
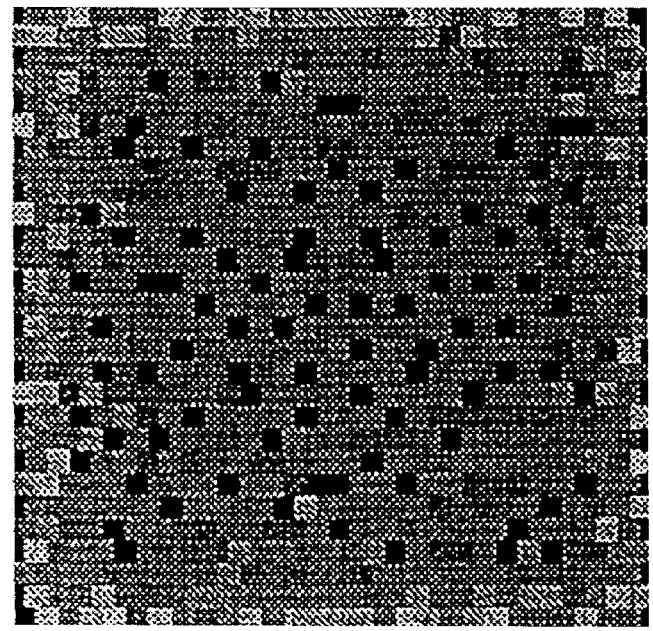
FIG. 20 is a photographic representation showing, in gray scale, the amounts of information carriers stored in the information carrier storing means resulting from the flow of a series of steps of the information transforming method according to the one embodiment of the present invention.
Figure 21:
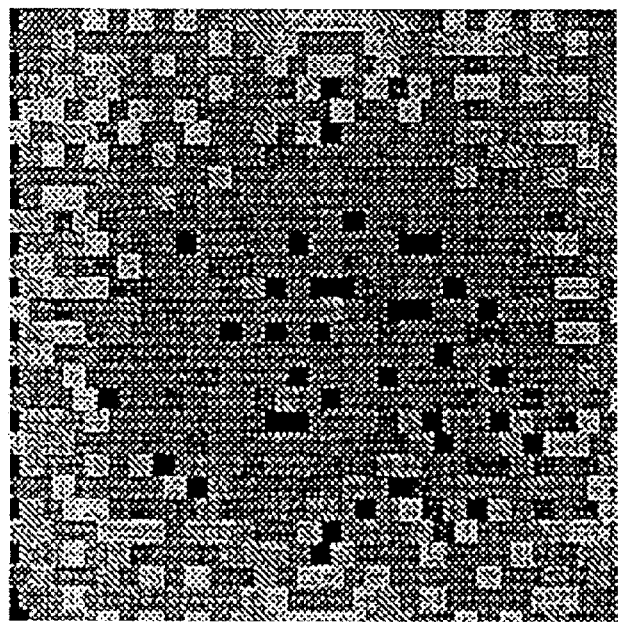
FIG. 21 is a photographic representation showing, in gray scale, the amounts of information carriers stored in the information carrier storing means resulting from the flow of a series of steps of the information transforming method according to the one embodiment of the present invention.
Figure 22:
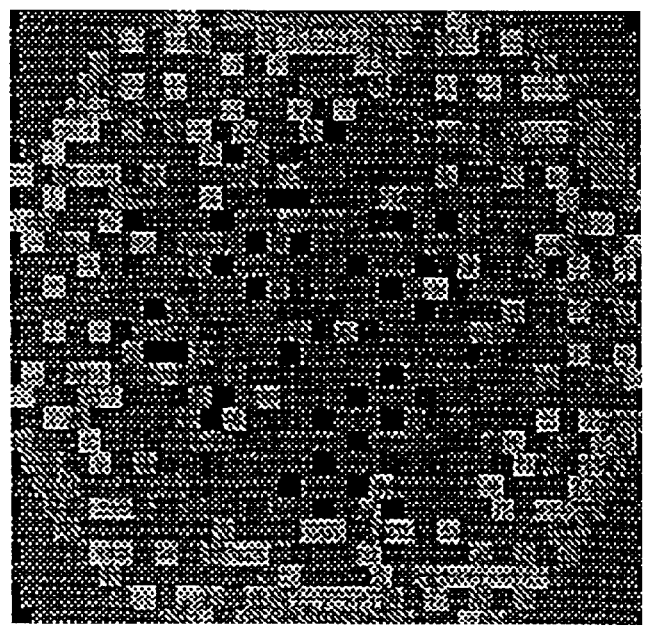
FIG. 22 is a photographic representation showing, in gray scale, the amounts of information carriers stored in the information carrier storing means resulting from the flow of a series of steps of the information transforming method according to the one embodiment of the present invention.
Figure 23:
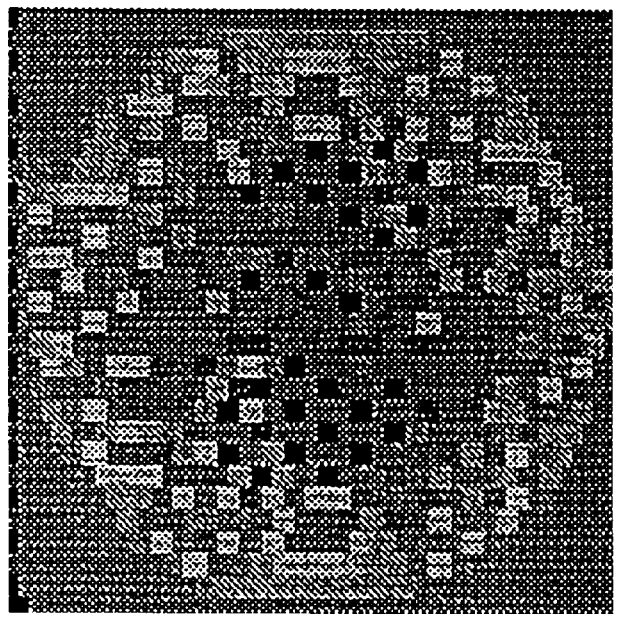
FIG. 23 is a photographic representation showing, in gray scale, the amounts of information carriers stored in the information carrier storing means resulting from the flow of a series of steps of the information transforming method according to the one embodiment of the present invention.
Figure 24:
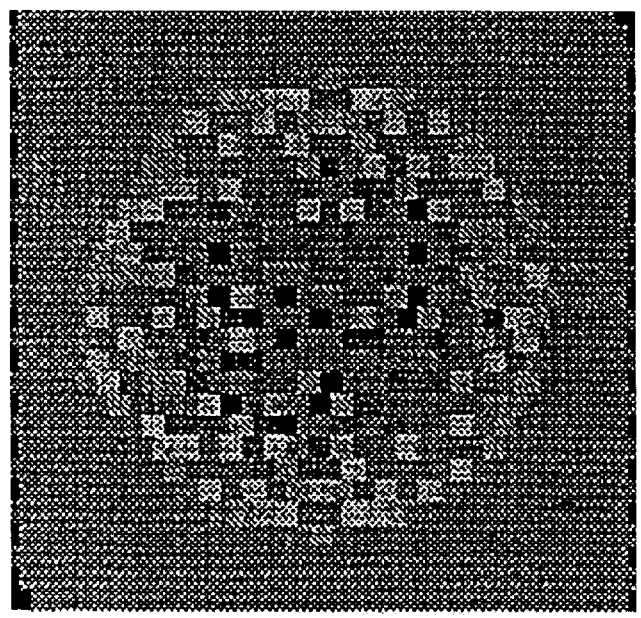
FIG. 24 is a photographic representation showing, in gray scale, the amounts of information carriers stored in the information carrier storing means resulting from the flow of a series of steps of the information transforming method according to the one embodiment of the present invention.
Figure 25:
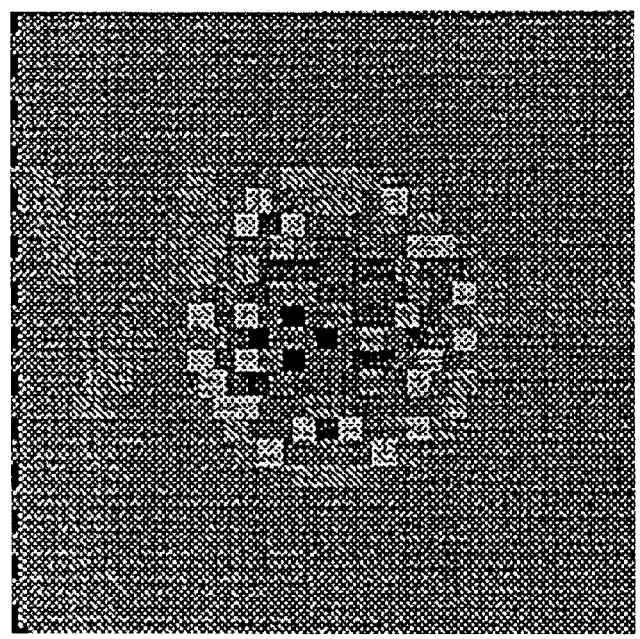
FIG. 25 is a photographic representation showing, in gray scale, the amounts of information carriers stored in the information carrier storing means resulting from the flow of a series of steps of the information transforming method according to the one embodiment of the present invention.
Figure 26:
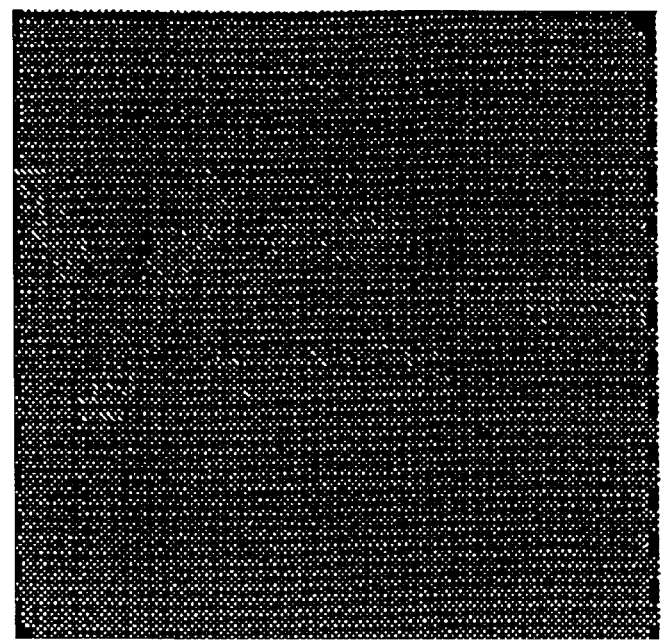
FIG. 26 is a photographic representation showing, in gray scale, the amounts of information carriers stored in the information carrier storing means resulting from the flow of a series of steps of the information transforming method according to the one embodiment of the present invention.

FIGS. 15 to 26 show the amounts of information carriers stored in the information carrier storing means 201 resulting from the flow of a series of steps subsequent to step S9. FIG. 15 shows the amounts of information carriers stored in the information carrier storing means 201 in the final state corresponding to step S8. Thus, FIG. 15 shows the same state as shown in FIG. 14. It is however to be noted that a level of the gray scale is changed for convenience in depicting the subsequent states. By repeating the process from step S9 to S12, the amounts of information carriers stored in the information carrier storing means 201 are changed successively as shown in FIGS. 16, 17, 18, 19 and 20. Because the information carriers are applied only to the information carrier storing means 201, which are positioned at the boundary, in the flow of a series of steps subsequent to step S9, the nonlinear diffusion occurs primarily in areas locating from the boundary toward the center. By further repeating the process from step S9 to S12, the amounts of information carriers stored in the information carrier storing means 201 are changed successively as shown in FIGS. 21, 22, 23, 24 and 25. Other intermediate states than shown are omitted. FIG. 26 shows the amounts of information carriers stored in the information carrier storing means 201 at the time of reaching the final state. A pattern appearing in FIG. 26 is essentially the same as the pattern appearing in FIG. 3 which shows the data input in step S1. The difference in pattern between FIGS. 26 and 3 is attributable only to a difference in direct current bias (i.e., in amount of the applied information carriers). The resultant final pattern is output in step S13.

As described above, the input two-dimensional image data shown in FIG. 3 is transformed through the process comprising a series of steps S2 to S8 into the final two-dimensional image data having the particular structure shown in FIG. 14. Then, the final two-dimensional image data shown in FIG. 14 is inversely transformed through the process comprising a series of steps S9 to S12 into the two-dimensional image data, shown in FIG. 26, which is essentially the same as shown in FIG. 3.

Figure 27:
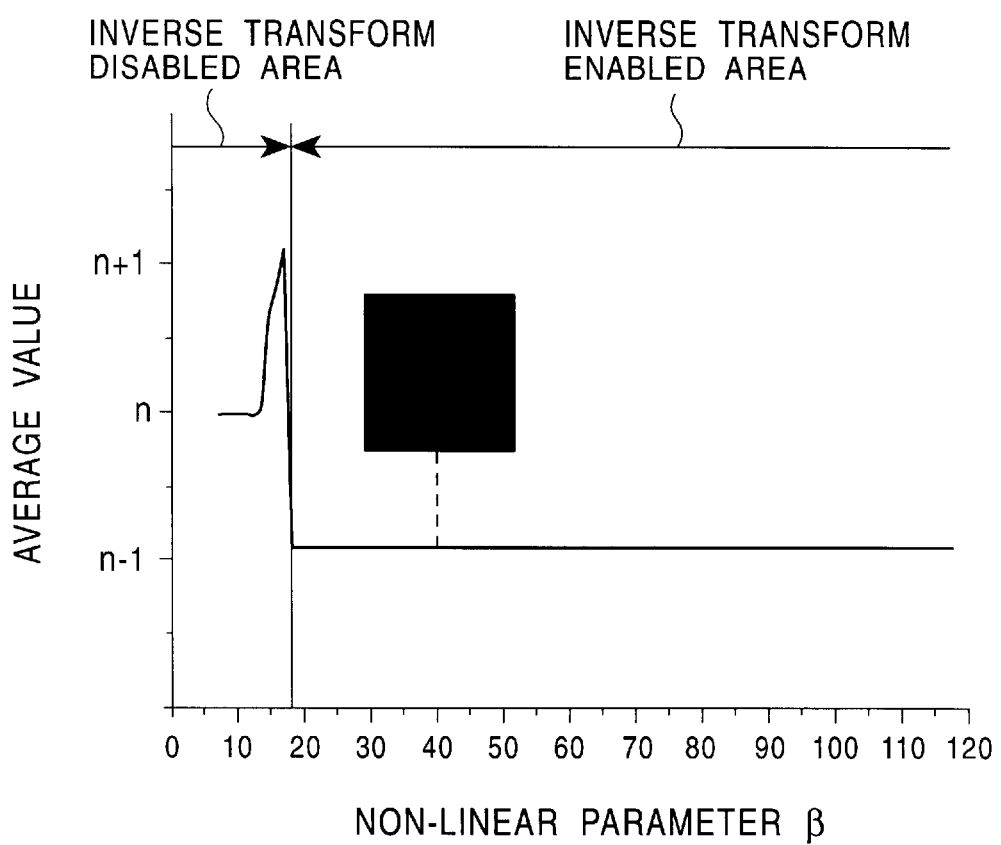
FIG. 27 is a graph showing changes in average value of a pattern of natural numbers resulting from threshold processing of final two-dimensional image data having a particular structure, shown in FIG. 14, when the value of β is varied in the information transforming method according to the one embodiment of the present invention.

While this embodiment employs 100 as a value of $\beta$, the value of $\beta$ is not limited to 100. A computer simulation proves that when the dissipation denoted by 204 in FIG. 2 is zero, for example, the above-described inverse transform is enabled if the value of $\beta$ is not smaller than 18. Another computer simulation proves that the range of such values of $\beta$ corresponds to a range in which the maximum value of natural numbers obtained by threshold processing of the final two-dimensional image data having the particular structure, shown in FIG. 14, is 5 or less. A graph of FIG. 27 shows changes in average value for a pattern of the natural numbers, which are obtained by threshold processing of the final two-dimensional image data having the particular structure shown in FIG. 14, when the value of $\beta$ is changed. As seen from FIG. 27, when the value of $\beta$ is smaller than 18, the maximum value of the resultant natural numbers is equal to or more than 6, and the inverse transform is disabled. This fact is indicated by an abrupt change of the average value in the graph.

Figure 28:
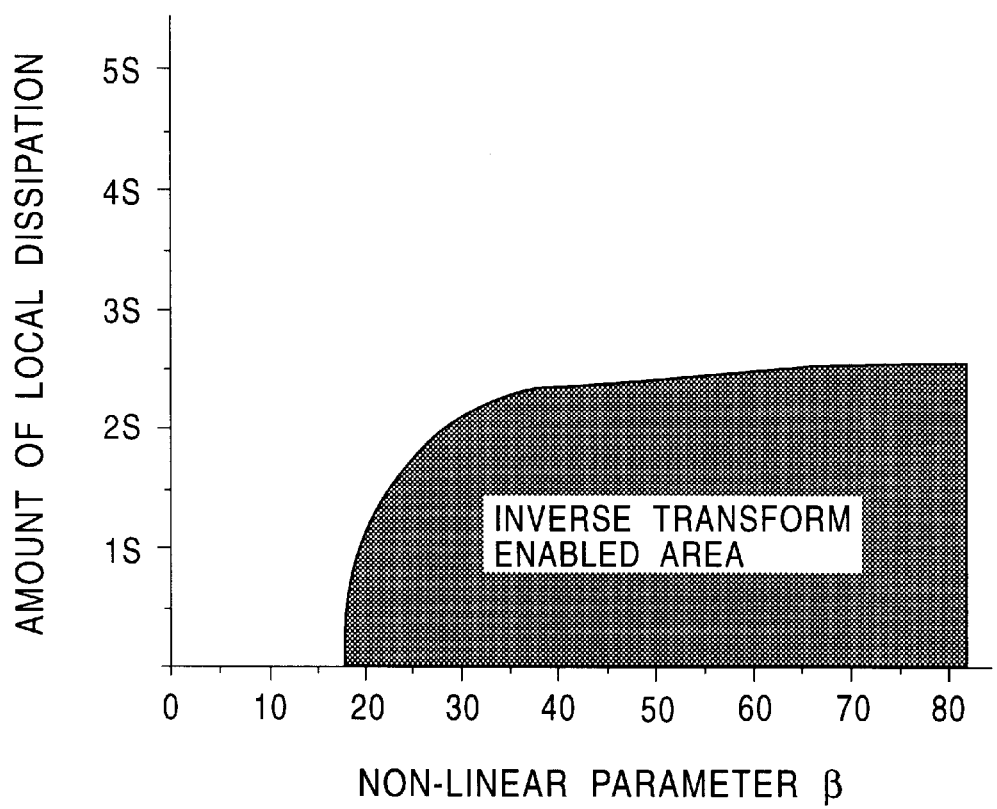
FIG. 28 is a graph showing an area in which inverse transform is enabled with the information transforming method according to the one embodiment of the present invention.

Further, as the result of a simulation including the case where the dissipation denoted by 204 in FIG. 2 is not zero, it has been proved that an area where the inverse transform is enabled is provided as shown in FIG. 28. In the graph of FIG. 28, the horizontal axis represents the value of $\beta$ and the vertical axis represents the amount of the dissipation denoted by 204 in FIG. 2. A constant S in the vertical axis is 0.00001 in this embodiment.

Figure 29:
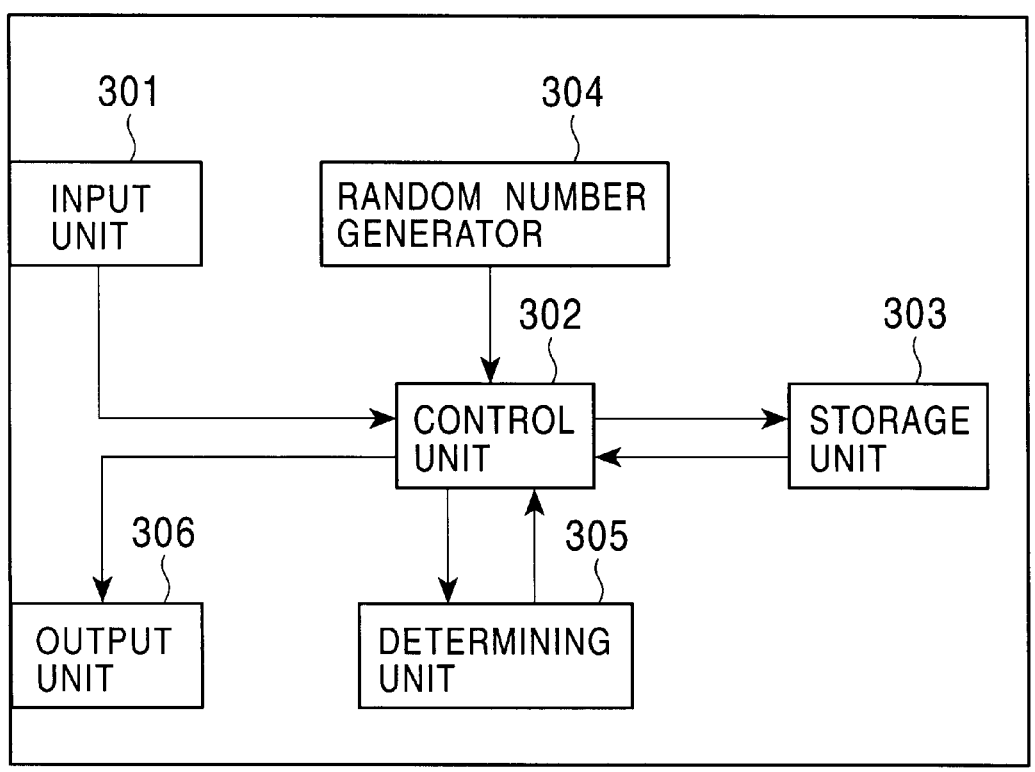
FIG. 29 is a block diagram showing a configuration of the information transforming apparatus according to the one embodiment of the present invention.

FIG. 29 is a block diagram showing an overall configuration of the information transforming apparatus according to the one embodiment. Referring to FIG. 29, numeral 301 denotes an input unit, 302 denotes a control unit, 303 denotes a storage unit, 304 denotes a random number generator, 305 denotes a determining unit, and 306 denotes an output unit.

Two-dimensional image data represented by 784-dimensional vectors and shown in FIG. 3, for example, is input from the input unit 301. The input data is sent to the control unit 302. The data sent to the control unit 302 is temporarily stored in the storage unit 303. The control unit 302 has the function of repeatedly executing processing for the data stored in the storage unit 303 to select the position to which the predetermined amount of information carriers are applied, to move the predetermined amount of information carriers, and to dissipate the predetermined amount of information carriers in accordance with the algorithm shown in the flowchart of FIG. 1. In the above processing, the position to which the predetermined amount of information carriers are applied in step S2 of FIG. 1 is selected using a random number generated by the random number generator 204. Also, in the above processing, the determinations in steps S6, S7 and S12 of FIG. 1 are made in the determining unit 305. Finally, a result of the processing is output from the output unit 306.

Examples of the input unit 301 include a CCD, photosensitive crystal, etc. One example of the storage unit 303 is a quantum dot device having the structure as shown in FIG. 2. In this case, information carriers are electrons. Examples of the output unit 306 include a CRT, etc.

The information transforming method according to the one embodiment can also be executed on a computer with a recording medium which stores a program for implementing the information transforming method and is readable by the computer.

With the one embodiment described above, one two-dimensional information pattern of continuous values, i.e., one two-dimensional image data, can be transformed into another two-dimensional image data, and the two-dimensional image data having been transformed can be inversely transformed. Because of no need of processing input information into the discrete form in both the types of transform, a loss of the information can prevented. Also, since the information transform carried out in the one embodiment is a nonlinear transform using nonlinear diffusion expressed by the formulae (1) and (2), a variety of information processing can be performed which are difficult to achieve with a conventional linear transform such as Fourier transform or Laplace transform.

While one embodiment of the present invention has been described above in detail, the present invention is not limited to the above-described embodiment, but can be modified in various ways based on the technical concept of the invention.

For example, while total 784 units of information carrier storing means 201 are distributed over a two-dimensional space in a triangular lattice structure in the above-described one embodiment, the number and array of the information carrier storing means 201 are not limited to those in the embodiment, but may differ from them. Further, the information carrier storing means 201 may be arrayed over, for example, a three-dimensional space. It is also needless to say that while input data is two-dimensional image data in the above-described one embodiment, the input data is not limited to an image, but may be characters, voices, a string of control parameters, etc.

With the information processing method, the information processing apparatus and the recording medium according to the present invention, as described above, it is possible to transform one multidimensional information pattern into another multidimensional information pattern or inversely transform the multidimensional information pattern having been transformed, to realized a wide range of applications, to handle a continuous value, and to prevent a loss of information.

What is claimed is:

1. An information processing method comprising the steps of:

inputting information carriers expressed by n-dimensional vectors (n is a natural number) to n information carrier storing means distributed over an m-dimensional space (m is a natural number) and which hold the information carriers in a real number value;

processing for applying a predetermined amount of the information carriers to said information carrier storing means, moving a predetermined amount of the information carriers among a predetermined set of the information carrier storing means, and dissipating a predetermined amount of the information carriers from said information carrier storing means; and outputting the information carriers expressed by n-dimensional vectors from said n information carrier storing means, wherein said processing step includes a step of applying a predetermined amount of information carriers to said number n of information carrier storing means at random.

2. An information processing method comprising the steps of:

inputting information carriers expressed by n-dimensional vectors (n is a natural number) to n information carrier storing means distributed over an m-dimensional space (m is a natural number) and which hold the information carriers in a real number value;

processing for applying a predetermined amount of the information carriers to ones of said information carrier storing means which are positioned in a vicinity of a geometrical surface, moving a predetermined amount of the information carriers among a predetermined set of the information carrier storing means, and dissipating a predetermined amount of the information carriers from said information carrier storing means; and outputting the information carriers expressed by n-dimensional vectors from said n information carrier storing means, wherein said processing step includes a step of applying a predetermined amount of information carriers to said number n of information carrier storing means at random.

3. An information processing method comprising the steps of:

first inputting information carriers expressed by n-dimensional vectors (n is a natural number) to n information carrier storing means distributed over an m-dimensional space (m is a natural number) and which hold the information carriers in a real number value;

first repeating processing for applying a predetermined amount of the information carriers to said information carrier storing means, moving a predetermined amount of the information carriers among a predetermined set of the information carrier storing means, and dissipating a predetermined amount of the information carriers from said information carrier storing means;

first outputting the information carriers expressed by n-dimensional vectors from said n information carrier storing means;

second inputting the information carriers expressed by n-dimensional vectors and output in said outputting step to said n information carrier storing means;

second repeating processing for applying a predetermined amount of the information carriers to those of said information carrier storing means which are positioned in a vicinity of a geometrical surface, moving a predetermined amount of the information carriers among a predetermined set of the information carrier storing means, and dissipating a predetermined amount of the information carriers from said information carrier storing means; and second outputting the information carriers expressed by n-dimensional vectors from said number n of information carrier storing means.

4. An information processing method according to claim 3, wherein said processing step includes a diffusing step applying a predetermined amount of information carriers to said number n of information carrier storing means at random.

5. An information processing method according to claim 1, wherein said processing step includes a diffusing step of moving the information carriers in each of said information carrier storing means to the information carrier storing means which are positioned in the vicinity of each said information carrier storing means.

6. An information processing method according to claim 2, wherein said processing step includes a diffusing step of moving the information carriers in each of said information carrier storing means to the information carrier storing means which are positioned in the vicinity of each said information carrier storing means.

7. An information processing method according to claim 3, wherein said first processing step includes a diffusing step of moving the information carriers in each of said information carrier storing means to the information carrier storing means which are positioned in the vicinity of each said information carrier storing means.

8. An information processing method according to claim 3, wherein said second processing step includes a diffusing step of moving the information carriers in each of said information carrier storing means to the information carrier storing means which are positioned in the vicinity of each said information carrier storing means.

9. An information processing method according to claim 5, wherein said diffusing step is a step of diffusing the information carriers in said number n of information carrier storing means through nonlinear diffusion to the information carrier storing means which are positioned in the vicinity of each of said information carrier storing means.

10. An information processing method according to claim 6, wherein said diffusing step is a step of diffusing the information carriers in said number n of information carrier storing means through nonlinear diffusion to the information carrier storing means which are positioned in the vicinity of each of said information carrier storing means.

11. An information processing method according to claim 7, wherein said diffusing step is a step of diffusing the information carriers in said number n of information carrier storing means through nonlinear diffusion to the information carrier storing means which are positioned in the vicinity of each of said information carrier storing means.

12. An information processing method according to claim 8, wherein said diffusing step is a step of diffusing the information carriers in said number n of information carrier storing means through nonlinear diffusion to the information carrier storing means which are positioned in the vicinity of each of said information carrier storing means.

13. An information processing method according to claim 9, wherein said nonlinear diffusion is expressed by the following formula (1);

$$z(r,t+h)=z(r,t)+h\cdot(R(r,t)+D\cdot\nabla^2 f(z(r,t))-d(r,t)) \quad (1)$$

where r is spacial coordinate of each of said information carrier storing means, t is time, z(r,t) is an amount of information carriers stored in the information carrier storing means corresponding to the spacial coordinate r and the time t, h is a differential parameter, R(r,t) is a function representing the amount of applied information carriers, D is a diffusion constant, f(z(r,t)) is a function defined by the following formula (2), and d(r,t) is a function representing the dissipation of information carriers, and the following formula (2);

$$f(z(r,t)) = \frac{1}{1+\exp[-\beta(z(r,t)-z_0)]} \quad (2)$$

where β and $z_0$ are each a predetermined constant.

14. An information processing method according to claim 10, wherein said nonlinear diffusion is expressed by the following formula (1);

$$z(r,t+h)=z(r,t)+h\cdot(R(r,t)+D\cdot\nabla^2 f(z(r,t))-d(r,t)) \quad (1)$$

where r is spacial coordinate of each of said information carrier storing means, t is time, z(r,t) is an amount of information carriers stored in the information carrier storing means corresponding to the spacial coordinate r and the time t, h is a differential parameter, R(r,t) is a function representing the amount of applied information carriers, D is a diffusion constant, f(z(r,t)) is a function defined by the following formula (2), and d(r,t) is a function representing the dissipation of information carriers, and the following formula (2);

$$f(z(r,t)) = \frac{1}{1+\exp[-\beta(z(r,t)-z_0)]} \quad (2)$$

where β and $z_0$ are each a predetermined constant.

15. An information processing method according to claim 11, wherein said nonlinear diffusion is expressed by the following formula (1);

$$z(r,t+h)=z(r,t)+h\cdot(R(r,t)+D\cdot\nabla^2 f(z(r,t))-d(r,t)) \quad (1)$$

where r is spacial coordinate of each of said information carrier storing means, t is time, z(r,t) is an amount of information carriers stored in the information carrier storing means corresponding to the spacial coordinate r and the time t, h is a differential parameter, R(r,t) is a function representing the amount of applied information carriers, D is a diffusion constant, f(z(r,t)) is a function defined by the following formula (2), and d(r,t) is a function representing the dissipation of information carriers, and the following formula (2);

$$f(z(r,t)) = \frac{1}{1+\exp[-\beta(z(r,t)-z_0)]} \quad (2)$$

where β and $z_0$ are each a predetermined constant.

16. An information processing method according to claim 12, wherein said nonlinear diffusion is expressed by the following formula (1);

$$z(r,t+h)=z(r,t)+h\cdot(R(r,t)+D\cdot\nabla^2 f(z(r,t))-d(r,t)) \quad (1)$$

where r is spacial coordinate of each of said information carrier storing means, t is time, z(r,t) is an amount of information carriers stored in the information carrier storing means corresponding to the spacial coordinate r and the time t, h is a differential parameter, R(r,t) is a function representing the amount of applied information carriers, D is a diffusion constant, f(z(r,t)) is a function defined by the following formula (2), and d(r,t) is a function representing the dissipation of information carriers, and the following formula (2);

$$f(z(r,t)) = \frac{1}{1+\exp[-\beta(z(r,t)-z_0)]} \quad (2)$$

where β and $z_0$ are each a predetermined constant.

17. An information processing method according to claim 1, wherein said processing step includes a step of dissipating the information carriers from the information carrier storing means which are positioned in the vicinity of a surface defined by a distributed group of said number n of information carrier storing means.

18. An information processing method according to claim 2, wherein said processing step includes a step of dissipating the information carriers from the information carrier storing means which are positioned in the vicinity of a surface defined by a distributed group of said number n of information carrier storing means.

19. An information processing method according to claim 3, wherein said first processing step includes a step of dissipating the information carriers from the information carrier storing means which are positioned in the vicinity of a surface defined by a distributed group of said number n of information carrier storing means.

20. An information processing method according to claim 3, wherein said second processing step includes a step of dissipating the information carriers from the information carrier storing means which are positioned in the vicinity of a surface defined by a distributed group of said number n of information carrier storing means.

21. An information processing method according to claim 17, wherein said processing step further includes a step of dissipating the information carriers from said number n of information carrier storing means.

22. An information processing method according to claim 18, wherein said processing step further includes a step of dissipating the information carriers from said number n of information carrier storing means.

23. An information processing method according to claim 19, wherein said first processing step further includes a step of dissipating the information carriers from said number n of information carrier storing means.

24. An information processing method according to claim 19, wherein said second processing step further includes a step of dissipating the information carriers from said number n of information carrier storing means.

25. An information processing method according to claim 2, wherein said processing step includes a step of applying a predetermined amount of information carriers to the information carrier storing means which are positioned in the vicinity of a surface defined by a distributed group of said number n of information carrier storing means.

26. An information processing method according to claim 3, wherein said second processing step includes a step of applying a predetermined amount of information carriers to the information carrier storing means which are positioned in the vicinity of a surface defined by a distributed group of said number n of information carrier storing means.

27. An information processing method according to claim 2, wherein said processing step applies information carriers in such an amount that an integral value becomes equal to the product of the number of the information carrier storing means, which are positioned in the vicinity of each of said information carrier storing means, and n.

28. An information processing method according to claim 3, wherein said first processing step applies information carriers in such an amount that an integral value becomes equal to the product of the number of the information carrier storing means, which are positioned in the vicinity of each of said information carrier storing means, and n.

29. An information processing method according to claim 1, wherein said inputting step includes a step of binary-coding each element of the information carriers expressed by n-dimensional vectors.

30. An information processing method according to claim 3, wherein said first inputting step includes a step of binary-coding each element of the information carriers expressed by n-dimensional vectors.

31. An information processing method according to claim 13, wherein $\beta$ is set such that a maximum value of natural numbers resulting from the n-dimensional vectors output in said outputting step is equal to the value obtained by subtracting one from the number of the information carrier storing means which are positioned in the vicinity of each of said information carrier storing means.

32. An information processing method according to claim 14, wherein $\beta$ is set such that a maximum value of natural numbers resulting from the n-dimensional vectors output in said outputting step is equal to the value obtained by subtracting one from the number of the information carrier storing means which are positioned in the vicinity of each of said information carrier storing means.

33. An information processing method according to claim 15, wherein $\beta$ is set such that a maximum value of natural numbers resulting from the n-dimensional vectors output in said first outputting step is equal to the value obtained by subtracting one from the number of the information carrier storing means which are positioned in the vicinity of each of said information carrier storing means.

34. An information processing method according to claim 16, wherein $\beta$ is set such that a maximum value of natural numbers resulting from the n-dimensional vectors output in said second outputting step is equal to the value obtained by subtracting one from the number of the information carrier storing means which are positioned in the vicinity of each of said information carrier storing means.

35. An information processing apparatus employing a number n (n is a natural number) of information carrier storing means distributed over an m-dimensional space (m is a natural number) and which hold the information carriers in a real number value, said apparatus comprising:

means for inputting the information carriers expressed by n-dimensional vectors to said information carrier storing means;

means for repeating processing to apply a predetermined amount of the information carriers to said information carrier storing means, to move a predetermined amount of the information carriers among a predetermined set of the information carrier storing means, and to dissipate a predetermined amount of the information carriers from said information carrier storing means; and means for outputting the information carriers expressed by n-dimensional vectors from said number n of information carrier storing means, wherein said means for repeating processing includes means for applying a predetermined amount of the information carriers to said n information carrier storing means at random.

36. An information processing apparatus employing a number n (n is a natural number) of information carrier storing means distributed over an m-dimensional space (m is a natural number) and which hold the information carriers in a real number value, said apparatus comprising:

means for inputting the information carriers expressed by n-dimensional vectors (n is a natural number) to said information carrier storing means;

means for repeating processing to apply a predetermined amount of the information carriers to those of said information carrier storing means which are positioned in a vicinity of a geometrical surface, to move a predetermined amount of the information carriers among a predetermined set of the information carrier storing means, and to dissipate a predetermined amount of the information carriers from said information carrier storing means; and means for outputting the information carriers expressed by n-dimensional vectors from said number n of information carrier storing means, wherein said means for repeating processing includes means for applying a predetermined amount of the information carriers to said n information carrier storing means at random.

37. An information processing apparatus employing a number n (n is a natural number) of information carrier storing means distributed over an m-dimensional space (m is a natural number) and which hold the information carriers in a real number value, said apparatus comprising:

first means for inputting information carriers expressed by n-dimensional vectors (n is a natural number) to said information carrier storing means;

first means for repeating processing to apply a predetermined amount of the information carriers to said information carrier storing means, to move a predetermined amount of the information carriers among a predetermined set of the information carrier storing means, and to dissipate a predetermined amount of the information carriers from said information carrier storing means;

first means for outputting the information carriers expressed by n-dimensional vectors from said n information carrier storing means;

second means for inputting the information carriers expressed by n-dimensional vectors and output by said first means for outputting to said information carrier storing means;

second means for repeating processing to apply a predetermined amount of the information carriers to those of said information carrier storing means which are positioned in a vicinity of a geometrical surface, to move a predetermined amount of the information carriers among a predetermined set of the information carrier storing means, and to dissipate a predetermined amount of the information carriers from said information carrier storing means; and second means outputting the information carriers expressed by n-dimensional vectors from said n information carrier storing means.

38. An information processing apparatus according to claim 36, wherein said first means for repeating processing includes means for applying a predetermined amount of the information carriers to said number n of information carrier storing means at random.

39. An information processing apparatus according to claim 35, wherein said means for processing includes a diffusing means for moving the information carriers in each of said information carrier storing means to the information carrier storing means which are positioned in a vicinity of each said information carrier storing means.

40. An information processing apparatus according to claim 36, wherein said means for processing includes diffusing means for moving the information carriers in each of said information carrier storing means to the information carrier storing means which are positioned in a vicinity of each said information carrier storing means.

41. An information processing apparatus according to claim 37, wherein said first means for processing includes diffusing means for moving the information carriers in each of said information carrier storing means to the information carrier storing means which are positioned in a vicinity of each said information carrier storing means.

42. An information processing apparatus according to claim 37, wherein said second means for processing includes diffusing means for moving the information carriers in each of said information carrier storing means to the information carrier storing means which are positioned in a vicinity of each said information carrier storing means.

43. An information processing apparatus according to claim 39, wherein said diffusing means includes a device for diffusing the information carriers in said n information carrier storing means through nonlinear diffusion to the information carrier storing means which are positioned in a vicinity of each of said information carrier storing means.

44. An information processing apparatus according to claim 40, wherein said diffusing means includes a device for diffusing the information carriers in said n information carrier storing means through nonlinear diffusion to the information carrier storing means which are positioned in a vicinity of each of said information carrier storing means.

45. An information processing apparatus according to claim 41, wherein said diffusing means includes a device for diffusing the information carriers in said n information carrier storing means through nonlinear diffusion to the information carrier storing means which are positioned in a vicinity of each of said information carrier storing means.

46. An information processing apparatus according to claim 42, wherein said diffusing means includes a device for diffusing the information carriers in said n information carrier storing means through nonlinear diffusion to the information carrier storing means which are positioned in the vicinity of each of said information carrier storing means.

47. An information processing apparatus according to claim 43, wherein said nonlinear diffusion is expressed by the following formula (1);

$$z(r,t+h)=z(r,t)+h\cdot(R(r,t)+D\cdot\nabla^2 f(z(r,t))-d(r,t)) \qquad (1)$$

where r is spacial coordinate of each of said information carrier storing means, t is time, z(r,t) is an amount of information carriers stored in the information carrier storing means corresponding to the spacial coordinate r and the time t, h is a differential parameter, R(r,t) is a function representing the amount of applied information carriers, D is a diffusion constant, f(z(r,t)) is a function defined by the following formula (2), and d(r,t) is a function representing the dissipation of information carriers, and the following formula (2);

$$f(z(r,t)) = \frac{1}{1+\exp[-\beta(z(r,t)-z_0)]} \qquad (2)$$

where $\beta$ and $z_0$ are each a predetermined constant.

48. An information processing apparatus according to claim 44, wherein said nonlinear diffusion is expressed by the following formula (1);

$$z(r,t+h)=z(r,t)+h\cdot(R(r,t)+D\cdot\nabla^2 f(z(r,t))-d(r,t)) \qquad (1)$$

where r is spacial coordinate of each of said information carrier storing means, t is time, z(r,t) is an amount of information carriers stored in the information carrier storing means corresponding to the spacial coordinate r and the time t, h is a differential parameter, R(r,t) is a function representing the amount of applied information carriers, D is a diffusion constant, f(z(r,t)) is a function defined by the following formula (2), and d(r,t) is a function representing the dissipation of information carriers, and the following formula (2);

$$f(z(r,t)) = \frac{1}{1+\exp[-\beta(z(r,t)-z_0)]} \qquad (2)$$

where $\beta$ and $z_0$ are each a predetermined constant.

49. An information processing apparatus according to claim 45, wherein said nonlinear diffusion is expressed by the following formula (1);

$$z(r,t+h)=z(r,t)+h\cdot(R(r,t)+D\cdot\nabla^2 f(z(r,t))-d(r,t)) \qquad (1)$$

where r is spacial coordinate of each of said information carrier storing means, t is time, z(r,t) is an amount of information carriers stored in the information carrier storing means corresponding to the spacial coordinate r and the time t, h is a differential parameter, R(r,t) is a function representing the amount of applied information carriers, D is a diffusion constant, f(z(r,t)) is a function defined by the following formula (2), and d(r,t) is a function representing the dissipation of information carriers, and the following formula (2);

$$f(z(r, t)) = \frac{1}{1 + \exp[-\beta(z(r, t) - z_0)]} \quad (2)$$

where $\beta$ and $z_0$ are each a predetermined constant.

50. An information processing apparatus according to claim 46, wherein said nonlinear diffusion is expressed by the following formula (1);

$$z(r,t+h) = z(r,t) + h \cdot (R(r,t) + D \cdot \nabla^2 f(z(r,t)) - d(r,t)) \quad (1)$$

where r is spacial coordinate of each of said information carrier storing means, t is time, z(r,t) is an amount of information carriers stored in the information carrier storing means corresponding to the spacial coordinate r and the time t, h is a differential parameter, R(r,t) is a function representing the amount of applied information carriers, D is a diffusion constant, f(z(r,t)) is a function defined by the following formula (2), and d(r,t) is a function representing the dissipation of information carriers, and the following formula (2);

$$f(z(r, t)) = \frac{1}{1 + \exp[-\beta(z(r, t) - z_0)]} \quad (2)$$

where $\beta$ and $z_0$ are each a predetermined constant.

51. An information processing apparatus according to claim 35, wherein said means for repeating processing includes means for dissipating the information carriers from the information carrier storing means which are positioned in vicinity of a surface defined by a distributed group of said n information carrier storing means.

52. An information processing apparatus according to claim 36, wherein said means for repeating processing includes means for dissipating the information carriers from the information carrier storing means which are positioned in a vicinity of a surface defined by a distributed group of said n information carrier storing means.

53. An information processing apparatus according to claim 37, wherein said first means for repeating processing includes means for dissipating the information carriers from the information carrier storing means which are positioned in a vicinity of a surface defined by a distributed group of said n information carrier storing means.

54. An information processing apparatus according to claim 37, wherein said second means for repeating processing includes means for dissipating the information carriers from the information carrier storing means which are positioned in a vicinity of a surface defined by a distributed group of said n information carrier storing means.

55. An information processing apparatus according to claim 51, wherein said means for repeating processing further includes means dissipating the information carriers from said n information carrier storing means.

56. An information processing apparatus according to claim 52, wherein said means for repeating processing further includes means for dissipating the information carriers from said n information carrier storing means.

57. An information processing apparatus according to claim 53, wherein said first means for repeating processing further includes means for dissipating the information carriers from said n information carrier storing means.

58. An information processing apparatus according to claim 53, wherein said second means for repeating processing further includes means for dissipating the information carriers from said n information carrier storing means.

59. An information processing apparatus according to claim 36, wherein said means for repeating processing includes means for applying a predetermined amount of the information carriers to the information carrier storing means which are positioned in vicinity of a surface defined by a distributed group of said n information carrier storing means.

60. An information processing apparatus according to claim 37, wherein said second means for repeating processing includes means for applying a predetermined amount of the information carriers to the information carrier storing means which are positioned in the vicinity of a surface defined by a distributed group of said n information carrier storing means.

61. An information processing apparatus according to claim 35, wherein said means for repeating processing includes means for applying information carriers in such an amount that an integral value becomes equal to a product of the number of the information carrier storing means, which are positioned in the vicinity of each of said information carrier storing means, and n.

62. An information processing apparatus according to claim 37, wherein said first means for repeating processing includes means for applying the information carriers in such an amount that an integral value becomes equal to a product of the number of the information carrier storing means, which are positioned in the vicinity of each of said information carrier storing means, and n.

63. An information processing apparatus according to claim 35, wherein said means for inputting includes means for binary-coding each element of the information carriers expressed by n-dimensional vectors.

64. An information processing apparatus according to claim 37, wherein said first means for inputting includes means for binary-coding each element of the information carriers expressed by n-dimensional vectors.

65. An information processing apparatus according to claim 47, wherein is set such that a maximum value of natural numbers resulting from the n-dimensional vectors output by said means for outputting is equal to a value obtained by subtracting one from the number of the information carrier storing means which are positioned in the vicinity of each of said information carrier storing means.

66. An information processing apparatus according to claim 48, wherein is set such that a maximum value of natural numbers resulting from the n-dimensional vectors output by said means for outputting is equal to a value obtained by subtracting one from the number of the information carrier storing means which are positioned in the vicinity of each of said information carrier storing means.

67. An information processing apparatus according to claim 49, wherein is set such that a maximum value of natural numbers resulting from the n-dimensional vectors output by said first means for outputting is equal to a value obtained by subtracting one from the number of the information carrier storing means which are positioned in the vicinity of each of said information carrier storing means.

68. An information processing apparatus according to claim 50, wherein is set such that a maximum value of natural numbers resulting from the n-dimensional vectors output by said second means for outputting is equal to a value obtained by subtracting one from the number of the information carrier storing means which are positioned in the vicinity of each of said information carrier storing means.

69. An information processing apparatus according to claim 35, wherein m is equal to or less than 3.

70. An information processing apparatus according to claim 36, wherein m is equal to or less than 3.

71. An information processing apparatus according to claim 37, wherein m is equal to or less than 3.

72. An information processing apparatus comprising:
input means to which data expressed by n-dimensional vectors (n is a natural number) is input;
storage means made up of a n information carrier storing means for storing the data input to said input means;
control means for repeatedly executing processing to apply a predetermined amount of the information carriers to the data stored in said storage means, to move a predetermined amount of information carriers, and to dissipate a predetermined amount of the information carriers;
random number generating means for generating a random number and sending the generated random number to said control means;
determining means for determining whether a change in amount of the information carriers in each of said information carrier storing means has become equal to or less than a predetermined value; and
output means for outputting a processing result from said control means.

73. A recording medium recording an information processing program and being readable by a computer, said program comprising:
an inputting step of inputting information carriers expressed by n-dimensional vectors (n is a natural number) to n information carrier storing means which are distributed over an m-dimensional space (m is a natural number) and have the function of holding the information carriers in a real number value;
a processing step of repeating processing to apply a predetermined amount of the information carriers to said information carrier storing means, to move a predetermined amount of the information carriers among a predetermined set of the information carrier storing means, and to dissipate a predetermined amount of the information carriers from said information carrier storing means; and
an outputting step of outputting information carriers expressed by n-dimensional, vectors from said number n of information carrier storing means
wherein said processing step includes a step of applying a predetermined amount of the information carriers to said n information carrier storing means at random.

74. A recording medium recording an information processing program and being readable by a computer, said program comprising:
an inputting step of inputting information carriers expressed by n-dimensional vectors (n is a natural number) to n information carrier storing means which are distributed over an m-dimensional space (m is a natural number) and have the function of holding the information carriers in a real number value;
a processing step of repeating processing to apply a predetermined amount of the information carriers to those of said information carrier storing means which are positioned in the vicinity of a geometrical surface, to move a predetermined amount of the information carriers among a predetermined set of the information carrier storing means, and to dissipate a predetermined amount of information carriers from said information carrier storing means; and
an outputting step of outputting the information carriers expressed by n-dimensional vectors from said number n of information carrier storing means
wherein said processing step includes a step of applying a predetermined amount of the information carriers to said n information carrier storing means at random.

75. A recording medium recording an information processing program and being readable by a computer, said program comprising:
a first inputting step of inputting information carriers expressed by n-dimensional vectors (n is a natural number) to n information carrier storing means which are distributed over an m-dimensional space (m is a natural number) and have the function of holding the information carriers in a real number value;
a first processing step of repeating processing to apply a predetermined amount of the information carriers to said information carrier storing means, to move a predetermined amount of the information carriers among a predetermined set of the information carrier storing means, and to dissipate a predetermined amount of the information carriers from said information carrier storing means;
a first outputting step of outputting the information carriers expressed by n-dimensional vectors from said n information carrier storing means;
a second inputting step of inputting the information carriers expressed by n-dimensional vectors and output in said first outputting step to said n information carrier storing means;
a second processing step of repeating processing to apply a predetermined amount of the information carriers to those of said information carrier storing means which are positioned in a vicinity of a geometrical surface, to move a predetermined amount of the information carriers among a predetermined set of the information carrier storing means, and to dissipate a predetermined amount of the information carriers from said information carrier storing means; and
a second outputting step of outputting the information carriers expressed by n-dimensional vectors from said n information carrier storing means.

76. A recording medium according to claim 75, wherein said first processing step includes a step of applying a predetermined amount of the information carriers to said n information carrier storing means at random.

77. A recording medium according to claim 73, wherein said processing step includes a diffusing step of moving the information carriers in each of said information carrier storing means to the information carrier storing means which are positioned in the vicinity of each said information carrier storing means.

78. A recording medium according to claim 74, wherein said processing step includes a diffusing step of moving the information carriers in each of said information carrier storing means to the information carrier storing means which are positioned in the vicinity of each said information carrier storing means.

79. A recording medium according to claim 73, wherein said first processing step includes a diffusing step of moving the information carriers in each of said information carrier storing means to the information carrier storing means which are positioned in the vicinity of each said information carrier storing means.

80. A recording medium according to claim 73, wherein said second processing step includes a diffusing step of moving the information carriers in each of said information carrier storing means to the information carrier storing means which are positioned in the vicinity of each said information carrier storing means.

81. A recording medium according to claim 77, wherein said diffusing step is a step of diffusing the information carriers in said number n of information carrier storing means through nonlinear diffusion to the information carrier storing means which are positioned in the vicinity of each of said information carrier storing means.

82. A recording medium according to claim 78, wherein said diffusing step is a step of diffusing the information carriers in said number n of information carrier storing means through nonlinear diffusion to the information carrier storing means which are positioned in the vicinity of each of said information carrier storing means.

83. A recording medium according to claim 79, wherein said diffusing step is a step of diffusing the information carriers in said n information carrier storing means through nonlinear diffusion to the information carrier storing means which are positioned in the vicinity of each of said information carrier storing means.

84. A recording medium according to claim 80, wherein said diffusing step is a step of diffusing the information carriers in said n information carrier storing means through nonlinear diffusion to the information carrier storing means which are positioned in the vicinity of each of said information carrier storing means.

85. A recording medium according to claim 81, wherein said nonlinear diffusion is expressed by the following formula (1);

$$z(r,t+h) = z(r,t) + h \cdot (R(r,t) + D \cdot \nabla^2 f(z(r,t)) - d(r,t)) \quad (1)$$

where r is spacial coordinate of each of said information carrier storing means, t is time, z(r,t) is an amount of information carriers stored in the information carrier storing means corresponding to the spacial coordinate r and the time t, h is a differential parameter, R(r,t) is a function representing the amount of applied information carriers, D is a diffusion constant, f(z(r,t)) is a function defined by the following formula (2), and d(r,t) is a function representing the dissipation of information carriers, and the following formula (2);

$$f(z(r,t)) = \frac{1}{1 + \exp[-\beta(z(r,t) - z_0)]} \quad (2)$$

where $\beta$ and $z_0$ are each a predetermined constant.

86. A recording medium according to claim 82, wherein said nonlinear diffusion is expressed by the following formula (1);

$$z(r,t+h) = z(r,t) + h \cdot (R(r,t) + D \cdot \nabla^2 f(z(r,t)) - d(r,t)) \quad (1)$$

where r is spacial coordinate of each of said information carrier storing means, t is time, z(r,t) is an amount of information carriers stored in the information carrier storing means corresponding to the spacial coordinate r and the time t, h is a differential parameter, R(r,t) is a function representing the amount of applied information carriers, D is a diffusion constant, f(z(r,t)) is a function defined by the following formula (2), and d(r,t) is a function representing the dissipation of information carriers, and the following formula (2);

$$f(z(r,t)) = \frac{1}{1 + \exp[-\beta(z(r,t) - z_0)]} \quad (2)$$

where $\beta$ and $z_0$ are each a predetermined constant.

87. A recording medium according to claim 83, wherein said nonlinear diffusion is expressed by the following formula (1);

$$z(r,t+h) = z(r,t) + h \cdot (R(r,t) + D \cdot \nabla^2 f(z(r,t)) - d(r,t)) \quad (1)$$

where r is spacial coordinate of each of said information carrier storing means, t is time, z(r,t) is an amount of information carriers stored in the information carrier storing means corresponding to the spacial coordinate r and the time t, h is a differential parameter, R(r,t) is a function representing the amount of applied information carriers, D is a diffusion constant, f(z(r,t)) is a function defined by the following formula (2), and d(r,t) is a function representing the dissipation of information carriers, and the following formula (2);

$$f(z(r,t)) = \frac{1}{1 + \exp[-\beta(z(r,t) - z_0)]} \quad (2)$$

where $\beta$ and $z_0$ are each a predetermined constant.

88. A recording medium according to claim 84, wherein said nonlinear diffusion is expressed by the following formula (1);

$$z(r,t+h) = z(r,t) + h \cdot (R(r,t) + D \cdot \nabla^2 f(z(r,t)) - d(r,t)) \quad (1)$$

where r is spacial coordinate of each of said information carrier storing means, t is time, z(r,t) is an amount of information carriers stored in the information carrier storing means corresponding to the spacial coordinate r and the time t, h is a differential parameter, R(r,t) is a function representing the amount of applied information carriers, D is a diffusion constant, f(z(r,t)) is a function defined by the following formula (2), and d(r,t) is a function representing the dissipation of information carriers, and the following formula (2);

$$f(z(r,t)) = \frac{1}{1 + \exp[-\beta(z(r,t) - z_0)]} \quad (2)$$

where $\beta$ and $z_0$ are each a predetermined constant.

89. A recording medium according to claim 73, wherein said processing step includes a step of dissipating the information carriers from the information carrier storing means which are positioned in the vicinity of a surface defined by a distributed group of said n information carrier storing means.

90. A recording medium according to claim 74, wherein said processing step includes a step of dissipating the information carriers from the information carrier storing means which are positioned in the vicinity of a surface defined by a distributed group of said n information carrier storing means.

91. A recording medium according to claim 75, wherein said first processing step includes a step of dissipating the information carriers from the information carrier storing means which are positioned in the vicinity of a surface defined by a distributed group of said n information carrier storing means.

92. A recording medium according to claim 73, wherein said second processing step includes a step of dissipating the information carriers from the information carrier storing means which are positioned in the vicinity of a surface defined by a distributed group of said n information carrier storing means.

93. A recording medium according to claim 89, wherein said processing step further includes a step of dissipating the information carriers from said n information carrier storing means.

94. A recording medium according to claim 90, wherein said processing step further includes a step of dissipating the information carriers from said n information carrier storing means.

95. A recording medium according to claim 91, wherein said first processing step further includes a step of dissipating the information carriers from said n information carrier storing means.

96. A recording medium according to claim 92, wherein said second processing step further includes a step of dissipating the information carriers from said n information carrier storing means.

97. A recording medium according to claim 73, wherein said processing step includes a step of applying a predetermined amount of the information carriers to the information carrier storing means which are positioned in the vicinity of a surface defined by a distributed group of said n information carrier storing means.

98. A recording medium according to claim 75, wherein said second processing step includes a step of applying a predetermined amount of the information carriers to the information carrier storing means which are positioned in the vicinity of a surface defined by a distributed group of said n information carrier storing means.

99. A recording medium according to claim 73, wherein said processing step applies information carriers in such an amount that an integral value becomes equal to the product of the number of the information carrier storing means, which are positioned in the vicinity of each of said information carrier storing means, and n.

100. A recording medium according to claim 75, wherein said first processing step applies information carriers in such an amount that an integral value becomes equal to the product of the number of the information carrier storing means, which are positioned in the vicinity of each of said information carrier storing means, and n.

101. A recording medium according to claim 73, wherein said inputting step includes a step of binary-coding each element of the information carriers expressed by n-dimensional vectors.

102. A recording medium according to claim 75, wherein said first inputting step includes a step of binary-coding each element of the information carriers expressed by n-dimensional vectors.

103. A recording medium according to claim 85, wherein $\beta$ is set such that a maximum value of natural numbers resulting from the n-dimensional vectors output in said outputting step is equal to the value obtained by subtracting one from the number of the information carrier storing means which are positioned in the vicinity of each of said information carrier storing means.

104. A recording medium according to claim 86, wherein $\beta$ is set such that a maximum value of natural numbers resulting from the n-dimensional vectors output in said outputting step is equal to the value obtained by subtracting one from the number of the information carrier storing means which are positioned in the vicinity of each of said information carrier storing means.

105. A recording medium according to claim 87, wherein $\beta$ is set such that a maximum value of natural numbers resulting from the n-dimensional vectors output in said first outputting step is equal to the value obtained by subtracting one from the number of the information carrier storing means which are positioned in the vicinity of each of said information carrier storing means.

106. A recording medium according to claim 88, wherein $\beta$ is set such that a maximum value of natural numbers resulting from the n-dimensional vectors output in said second outputting step is equal to the value obtained by subtracting one from the number of the information carrier storing means which are positioned in the vicinity of each of said information carrier storing means.

\* \* \* \* \*